US010146216B2

(12) United States Patent
Sait et al.

(10) Patent No.: US 10,146,216 B2
(45) Date of Patent: Dec. 4, 2018

(54) AUTONOMOUS PROCESS INTERFACE SYSTEMS BASED ON DATA DISTRIBUTION SERVICE MIDDLEWARE

(71) Applicant: KING FAHD UNIVERSITY OF PETROLEUM AND MINERALS, Dhahran (SA)

(72) Inventors: Sadiq M. Sait, Dhahran (SA); Ghalib A. Al-Hashim, Dammam (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 374 days.

(21) Appl. No.: 15/075,611

(22) Filed: Mar. 21, 2016

(65) Prior Publication Data

US 2017/0104826 A1 Apr. 13, 2017

Related U.S. Application Data

(63) Continuation of application No. 14/878,766, filed on Oct. 8, 2015.

(51) Int. Cl.
*G05B 19/418* (2006.01)
*H04L 29/08* (2006.01)
(Continued)

(52) U.S. Cl.
CPC ..... *G05B 19/41855* (2013.01); *G05B 19/042* (2013.01); *G05B 19/08* (2013.01);
(Continued)

(58) Field of Classification Search
None
See application file for complete search history.

(56) References Cited

U.S. PATENT DOCUMENTS 6,718,234 B1 * 4/2004 Demoro ............... B01J 19/0033
700/269
6,826,590 B1 * 11/2004 Glanzer ................ G05B 9/03
370/249

(Continued)

FOREIGN PATENT DOCUMENTS

WO WO 2007/117705 A2 10/2007
WO WO 2008/026804 A1 3/2008
WO WO 2012/047654 A1 4/2012

OTHER PUBLICATIONS

International Search Report and Written Opinion dated Jun. 29, 2017 in PCT/IB2016/001844.

(Continued)

*Primary Examiner* — Philip Wang
(74) *Attorney, Agent, or Firm* — Oblon, McClelland, Maier & Neustadt, L.L.P.

(57) ABSTRACT

A collaborative automation platform and associated method include a fault-tolerant control server hosting one or more virtual controllers, and a fault-tolerant input/output server hosting a virtual input/output system. The collaborative automation platform also includes a master autonomous process interface system connected to the virtual input/output system, via a local area input/output network. The collaborative automation platform also includes a plurality of distributed autonomous process interface systems connected to the master autonomous process interface system, wherein each distributed autonomous process interface system is hardwired to a plurality of field instruments. The collaborative automation platform also includes real-time DDS middleware configured for execution with the fault-tolerant control server, the fault-tolerant input/output server, the master autonomous process interface system, and the plurality of distributed autonomous process interface systems.

11 Claims, 32 Drawing Sheets

(51) Int. Cl.
*G05B 19/08* (2006.01)
*G05B 19/042* (2006.01)

(52) U.S. Cl.
CPC ............ *H04L 67/10* (2013.01); *H04L 67/125* (2013.01); *G05B 2219/31088* (2013.01); *G05B 2219/33149* (2013.01); *G05B 2219/36366* (2013.01); *G05B 2219/42155* (2013.01); *Y02P 90/26* (2015.11)

(56) References Cited

U.S. PATENT DOCUMENTS

| | | | |
|---|---|---|---|
| 7,568,000 | B2 | 7/2009 | Keyes et al. |
| 8,078,622 | B2 | 12/2011 | Rabii et al. |
| 8,583,773 | B2 | 11/2013 | Pafumi et al. |
| 2002/0191592 | A1* | 12/2002 | Rogers .................... H04L 45/10 370/352 |
| 2006/0077917 | A1* | 4/2006 | Brahmajosyula ... H04L 12/4625 370/310 |
| 2010/0007483 | A1* | 1/2010 | Oh .......................... H04L 67/36 340/521 |
| 2010/0076617 | A1* | 3/2010 | Van Den Keybus ....................... G05B 19/042 700/297 |
| 2013/0108259 | A1 | 5/2013 | Srinivas et al. |
| 2014/0081475 | A1 | 3/2014 | Dorofeev et al. |
| 2014/0115153 | A1* | 4/2014 | Kim .................... H04L 41/0816 709/224 |
| 2014/0344326 | A1 | 11/2014 | Kamath et al. |
| 2015/0127876 | A1* | 5/2015 | Erni ................... G05B 19/4185 710/315 |

OTHER PUBLICATIONS

""MIDDLESTAR" Middleware for Process Control System", JFE Technical Report, No. 10, XP002767814, Dec. 2007, pp. 56-58.
Deji Chen et al.. "Middleware for Wireless Process Control Systems", WACERTS'04, URL: http://wacerts.di.fc.ul.pt/papers/Session1-ChenMok.pdf, XP155350581, Dec. 31, 2004, 4 pages.
INTEL Intelligent Systems, "Reducing Cost and Complexity with Industrial System Consolidation", http://www.intel.com/content/dam/www/public/us/en/documents/white-papers/reducing-cost-complexity-industrial-system-consolidation-paper.pdf, 2013, 8 pages.

* cited by examiner

Average Communication Latency through 100/Mbps Fast Ethernet Switch

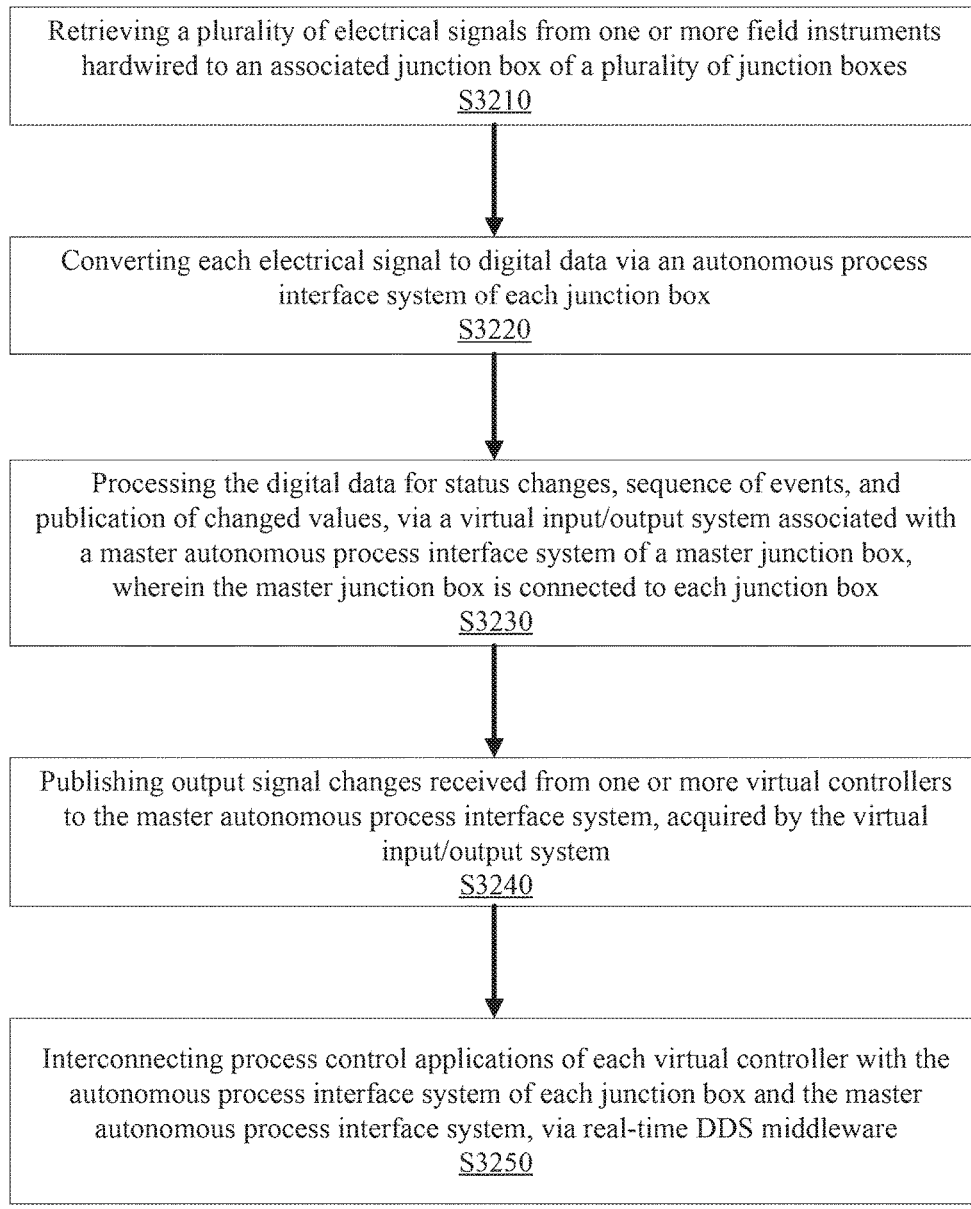

AUTONOMOUS PROCESS INTERFACE SYSTEMS BASED ON DATA DISTRIBUTION SERVICE MIDDLEWARE

RELATED APPLICATION

This application is a continuation of Ser. No. 14/878,766 filed on Oct. 8, 2015 and is incorporated in its entirety by reference herein.

BACKGROUND

Processing facilities in oil and gas, petrochemical, pharmaceutical, water/wastewater treatment, manufacturing, aerospace, travel, food, textile, film, hospital, leisure, foundry, agriculture, plastic, and printing industries utilize various process automation and safety systems in order to operate the plants safely and reliably to the optimal and maximum extent possible. Each system is manufactured by a specific vendor, utilizing specialized proprietary components. Although each system has its own unique history and characteristics, they all share a basic workload objective to ensure effective control of all disparate equipment within processing facilities in a cohesive fashion for improved safety, higher production rates, more efficient use of materials and energy, and consistent product quality.

The process automation technology has advanced rapidly since the mid-1980s; however, the latest systems still follow the traditional hierarchical structure of network layers, including field control network, plant control network, and plant information network. The main function of process control applications at the lowest network layer is to ensure a particular process doesn't vary by more than an allowed amount. The process control applications monitor the operation of associated parts of the process, identify unwanted changes, and initiate any necessary corrective actions. In the hierarchical structure, the control system at the middle network layer controls the overall production process and makes sure it continues to operate efficiently. At the plant network layer, the advanced control applications ensure optimum performance of processing units and improve the speed and accuracy of controlling a process. Reduced variability and increased predictability provide the operators a means to optimize the process by moving its operational setting closer to its constraints where the performance is likely to be higher. See W. Levine, *The Control Handbook* (CRC Press, 2010), incorporated herein by reference in its entirety.

The process automation systems run the gamut of age, technology, manufacturer, and family product series. As the equipment ages, components deteriorate, older technologies become superseded with newer products, manufacturers consolidate, product lines are eliminated, and technical support capabilities diminish. These reliability and obsolescence issues culminate in a broad range of challenges causing a huge escalating capital cost for managing the life cycle of these proprietary systems.

Most of the process automation and safety systems used in control applications are designed based on programmable logic controllers (PLC). FIG. 1 is a block diagram of a PLC hardware. A PLC includes a central processing unit (CPU), memory, input modules, output modules, and power supply. In FIG. 1, the arrows between blocks indicate the information and power flowing directions.

FIG. 2 is an illustration of a PLC operation cycle. There are four basic steps in the operation of a PLC, which continually take place in a repeating loop, including an input scan, a program scan, an output scan, and housekeeping. During the input scan, the PLC input modules detect the state of all input devices that are connected to the PLC. During the program scan, the PLC CPU executes the user created program logic. During the output scan, the PLC output modules energize or de-energize all output devices that are connected to the PLC. During the housekeeping step, the PLC CPU performs internal diagnostics and communications with programming terminals.

FIG. 3 is a block diagram of a PLC-based system architecture, which illustrates hardwired connections from field instruments up to human machine interface (HMI) consoles located at the Central Control Room (CCR). It spans through field junction boxes, marshaling cabinets, Input/Output (I/O) systems cabinets, controller system cabinets, Process Interface Buildings (PIBs), and a CCR rack room. The field instruments include pressure, level, flow, and temperature switches, valve position limit switches, motor status for pumps/compressors/mixers, start/stop command pushbuttons, field panel indicators, and start/stop and open/close output signals. Each field instrument is hard-wired to the closest junction box in the range of 10 to 50 meters. The junction boxes are enclosures used for cable interconnections between field devices and marshaling cabinets in PIBs and CCR. Each junction box includes terminal strips for cable terminations designed to suit environmental conditions in which the box will be installed, and to have certification of ingress protection code and hazardous area protection which conforms to the classified area.

Junction boxes can be hardwired using multicore cables to the closest marshaling cabinets inside PIBs or CCR in the range of 200 to 1000 meters. The function of the marshaling cabinet is to interface the incoming multicore cables with the I/O module system cables and to perform the cross wiring function. Cross wiring is necessary for the following reasons. Routing the input and output signals to the designated PLC is required. Mixing input and output field signals within the same incoming multicore cables and splitting them into consecutive and dedicated terminals for the associated I/O modules terminals is also required. In addition, the number of incoming field signals within multicore cables is often different from the number of channels per I/O module.

Each marshaling cabinet is hardwired using prefabricated multicore system cables to the designated system cabinets inside PIB/CCR in the range of 2 to 10 meters. The purpose of the system cabinet is to provide terminals to interface with the marshaling cabinets and to house the PLC power supply, I/O modules, controller CPU, communication modules, engineering work station, and the auxiliary power supply for powering the field instruments. The PIB is an explosive-proof building used to house and protect the system and marshaling cabinets from deteriorating effects of the weather. It is an unmanned and environmentally controlled building suitable to house delicate active electronics. Its location is carefully selected to withstand any unexpected field process explosion and be as close as possible to a large number of junction boxes in order to minimize cabling.

The CCR is a room serving as a central space where a large physical facility or physically-dispersed service can be monitored and controlled. The CCR for vital facilities are usually tightly secured and manned continuously. It has two major sections for a rack room and a control room. The function of the rack room is similar to the function of the PIB. The control room includes HMIs, engineering, and maintenance consoles, as well as auxiliary control panels for hardwired pull/push buttons for emergency and plant shutdown and annunciation panels for critical alerts. Consoles are interconnected through the plant information communication network. The CCR plant information communication network is extended by network segments to connect all PIBs that range from 1 Km to 10 Km in distance.

The PLC is designed based on a monolithic architecture, in which functionally distinguishable aspects such as the I/O system, the main control modules, and the control application, are not architecturally separate components but are all interwoven. This is similar to the mainframe computer architecture. The monolithic architecture does not allow for changing the design of certain aspects of the controller easily without having to overhaul the entire control application or to buy another controller altogether. For example, this happens when the controller becomes obsolete while the associated I/O system is still current and can be supported for several years to come.

A premature capital intensive investment of about 75% of the total cost of ownership is required for the replacement of the supported I/O system in order to replace the obsolete controller. Therefore, retaining the current I/O system and replacing only the associated obsolete controller is economically attractive. However, this option is not feasible due to either the lack of third party critical subcomponents or a new marketing strategy adopted by the vendor to surpass its competitors.

FIG. 4 is a block diagram of a distributed control system architecture, which illustrates a distributed control system 100 deployed in refining and petrochemical industries. Three different network layers include a field control network layer 110, a plant control network layer 120, and a plant information network layer 130. The architecture of distributed control system 100 is based on multiple proprietary or Ethernet-based local area field control networks called control segments 110, which extend from a central control room (CCR) 150 to process interface buildings (PIB)-1 160 and PIB-2 165, located close to processing facilities. Each control segment 110 connects two controllers 170 responsible for interfacing to field measurement and control devices through multiple junction boxes 180. The control segments 110 are interfaced to proprietary or Ethernet-based local area plant control network layer 120 located in the CCR 150, which connects multiple human machine interface (HMI) consoles 121, alarm management 122, a data historian 123, a data server 126, an advanced regulatory controller 124, and a multivariable controller 125. The data server 126 is connected to a proprietary or Ethernet-based local area plant information network layer 130 to provide near real-time process data to all nodes in the plant information network layer 130, including a processing unit controller 131, an advanced process controller 132, an inferential modeling unit 133 for predicting unmeasured process properties, and a lab information system 134 for calibrating the inferential models.

The controllers 170 perform basic control strategies including proportional, integral, and derivative (PID) continuous control loops and discrete sequence control to facilitate the basic operation, control, and automation requirements. The controllers 170 are distributed in the layer horizontally through the control segments 110. Each controller 170 is connected to its associated I/O racks 140 using a proprietary remote I/O communication (RI/OC) link. The controllers 170 are based on a monolithic architecture. The multivariable controller 125 of the plant control network layer 120 ensures minimum control loop interactions for achieving optimum performance of processing equipment. The advanced regulatory controller 124 provides feed forward, adaptive gain, and fuzzy logic control. See G. McMillan and D. Considine, *Process/Industrial Instruments and Controls Handbook* (McGraw-Hill, 1999), incorporated herein by reference in its entirety.

The processing unit controller 131 and the advanced process controller 132 are located above the plant control network layer 120. The processing unit controller 131 ensures optimum performance of processing units. The advanced process controller 132 improves the speed and accuracy of controlling a process by reducing variability and increasing predictability to provide operators with an optimized process by moving its operational setting closer to its constraints, where the performance tends to be higher. To achieve an optimum advanced process control solution, inferential models 133 are used to provide near real-time estimates of product qualities, which are otherwise available only through infrequent online or laboratory analysis. Inferential models are calibrated by using lab or on-line analyzer measurements to maintain their accuracy via the lab information system 134. See D. Coughanowr and S. LeBlanc, *Process Systems Analysis and Control* (McGraw-Hill, 2008), incorporated herein by reference in its entirety.

Today's competitive refining and petrochemical production environment is coupled with strict government laws and environmental regulations. As a result, there is a high demand on process industries to maximize valuable products and maintain high quality, and also minimize required energy consumption for survival and sustainability in the business. This challenging requirement mandates the utilization of agile and rigorous process control technology to increase productivity, improve quality, and minimize cost. See G. Coulouris, *Distributed Systems: Concepts and Design* (Addison-Wesley, 2011), incorporated herein by reference in its entirety.

In the 1980s, network-centric automation systems evolved resulting in distributed control system architectures. It is believed that higher performance can be achieved if greater amounts of data are shared throughout the enterprise using open systems. The drive towards openness in the 1980s gained momentum through the 1990s with the increased adoption of commercial off-the-shelf (COTS) components and Information Technology (IT) standards resulting in application-centric automation systems. Utilizing COTS components not only resulted in lower manufacturing costs for the supplier, but also decreased prices steadily for the end users. A major transition undertaken during this era was the development of Object Linking and Embedding for Process Control (OPC) technology and the move from the UNIX operating system to the Windows environment for everything above the controllers. Standard computer components from manufacturers, such as Intel and Motorola made it cost prohibitive for DCS suppliers to continue making their own workstations and networking hardware. The primary business of DCS suppliers, for years, had been the supply of large amounts of proprietary hardware, particularly controllers and associated I/O racks.

The computing power of the main control module is limited and not suitable for computing intensive control strategies. As a result, proprietary application modules are used for implementing advanced regulatory and multivariable control strategies at the plant control network layer. The plant control layer is proprietary and cannot accommodate third party applications. Hence, the standard rigorous solutions for advanced process control have been implemented at the plant network layer, utilizing near real-time process data provided by the OPC data server. The interaction among the heterogeneous process control applications across all network layers can be implemented using a client-server communication model.

The drive towards collaboration among applications in the 1990s gained momentum through the 21st century with the increased adoption of object-centric protocol for the interface among web applications using client-server communication models. This communication model works well for a system architecture in which there is a centralized server in each network layer. At the field control network layer, the process data is centralized within each associated controller. At the plant control network layer, the process data is centralized within a data server, which provides real-time process data to proprietary nodes from the same system vendor. At the plant network layer, the process data is centralized within an Object Linking and Embedding for Process Control (OPC) data server to provide near real-time plant data to nodes from different manufacturers. However, this model precludes deterministic communications and is not effective for exploiting the processing facilities to achieve maximum yield, since the information is being generated at multiple nodes and the client does not know when new information is available. See C. Pereira and L. Arro, *Distributed Real-Time Embedded Systems: Recent Advances, Future Trends and Their Impact on Manufacturing Automation*, Annual Reviews in Control, 31 (2007), pp. 81-92, incorporated herein by reference in its entirety.

SUMMARY

To address the above limitation on client-server models for real-time systems to achieve optimum process control environment, there is a need to move away from the multiple-network-layer architecture and away from the data centralization at the controllers and data servers. An objective is to develop a new vendor-independent and commercial off-the-shelf (COTS) clustered automation platform to address the reliability and obsolescence challenges that result from the life cycle management of proprietary PLC-based systems, while also meeting plant requirements and utilizing minimum system resources. The clustered automation platform is based on decoupling the controller from the I/O system, which capitalizes on emerging real-time data distribution service (DDS) middleware technology, as well as the evolution of high performance and fault-tolerant computing and networking technologies.

In an embodiment, a collaborative automation platform includes a controller server hosting one or more controllers, wherein each controller is configured to run a control application. The collaborative automation platform also includes a master junction box having a master autonomous process interface system, and a plurality of junction boxes connected to the master junction box. Each junction box is hard-wired to one or more field instruments and is configured to receive measurement data from each field instrument. The collaborative automation platform also includes an input/output server hosting one or more input/output systems, wherein each input/output system is connected to a respective master autonomous process interface system. Each input/output system is configured to acquire status changes of each junction box, record a sequence of events based on the acquired status changes, generate applicable alarms based on the sequence of events, and publish any changed values to subscribers, via real-time DDS middleware.

In another embodiment, a collaborative automation platform includes a fault-tolerant control server hosting one or more virtual controllers, and a fault-tolerant input/output server hosting a virtual input/output system. The collaborative automation platform also includes a master autonomous process interface system connected to the virtual input/output system, via a local area input/output network. The collaborative automation platform also includes a plurality of distributed autonomous process interface systems connected to the master autonomous process interface system, wherein each distributed autonomous process interface system is hardwired to a plurality of field instruments. The collaborative automation platform also includes real-time DDS middleware configured for execution with the fault-tolerant control server, the fault-tolerant input/output server, the master autonomous process interface system, and the plurality of distributed autonomous process interface systems.

In another embodiment, a method of retrieving and processing real-time data includes retrieving a plurality of electrical signals from one or more field instruments hardwired to an associated junction box of a plurality of junction boxes, and converting each electrical signal to digital data via an autonomous process interface system of each junction box. The method also includes processing the digital data for status changes, sequence of events, and publication of changed values, via a virtual input/output system associated with a master autonomous process interface system of a master junction box, wherein the master junction box is connected to each junction box. The method also includes publishing output signal changes received from one or more virtual controllers to the master autonomous process interface system, acquired by the virtual input/output system. The method also includes interconnecting process control applications of each virtual controller with the autonomous process interface system of each junction box and the master autonomous process interface system, via real-time DDS middleware.

Potential benefits of embodiments of the invention described herein include the following.
  Overcoming obsolescence challenges of proprietary PLC equipment.
  Reducing initial capital cost by eliminating the need for PIBs, marshaling and system cabinets, and associated cabling, as well as the need for multiple proprietary standalone controllers and communication components.
  Minimizing the life cycle capital cost to sustain the initial capital investment.
  Improving real-time system integration.
  Improving cyber-security protection at the control level.
  The foregoing paragraphs have been provided by way of general introduction, and are not intended to limit the scope of the following claims. The described embodiments will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 32 is an algorithmic flowchart illustrating an exemplary method of retrieving and processing real-time data according to an embodiment.

DETAILED DESCRIPTION

Figure 1:
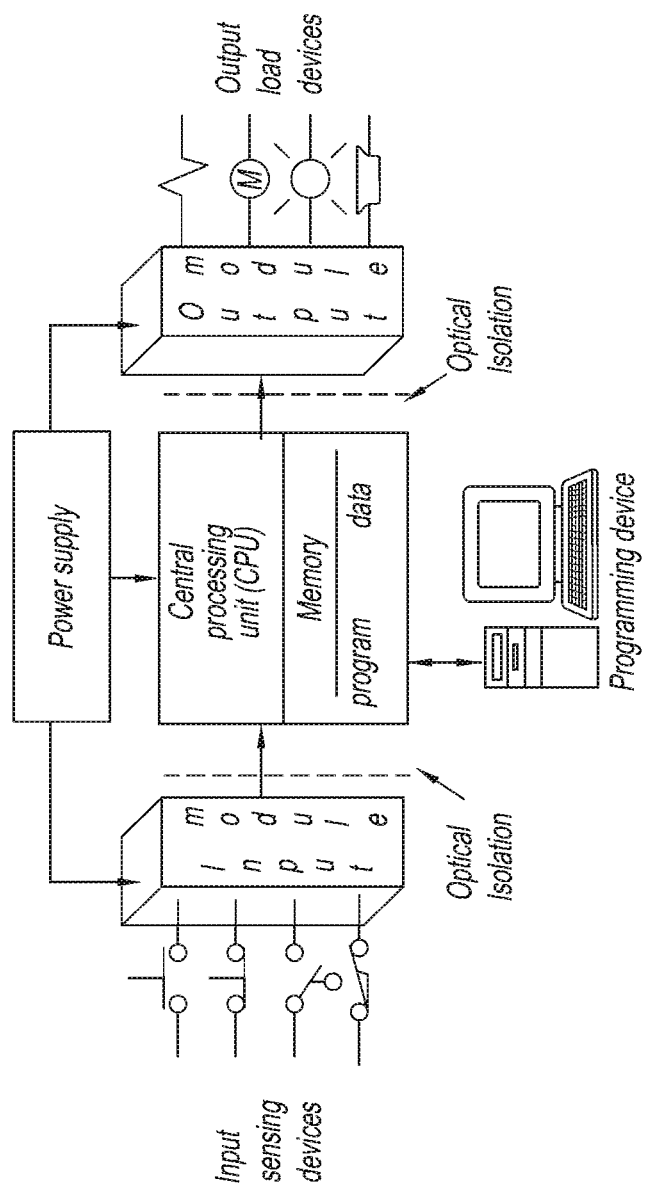
FIG. 1 is a block diagram of a PLC hardware according to an embodiment.
Figure 2:
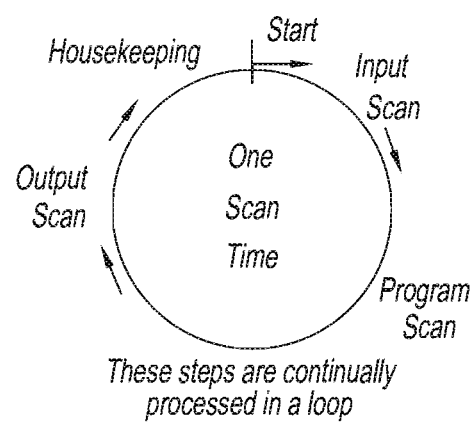
FIG. 2 is an illustration of a PLC operation cycle according to an embodiment.
Figure 3:
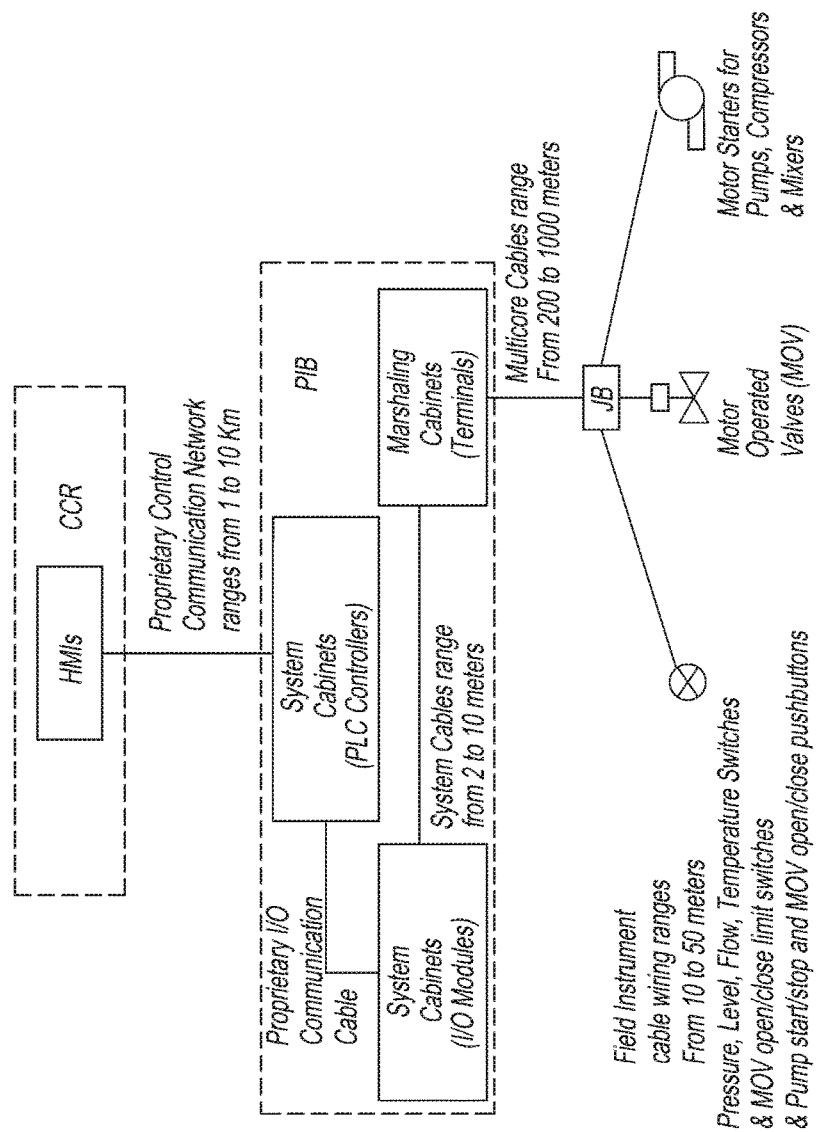
FIG. 3 is a block diagram of a PLC-based system architecture according to an embodiment.
Figure 4:
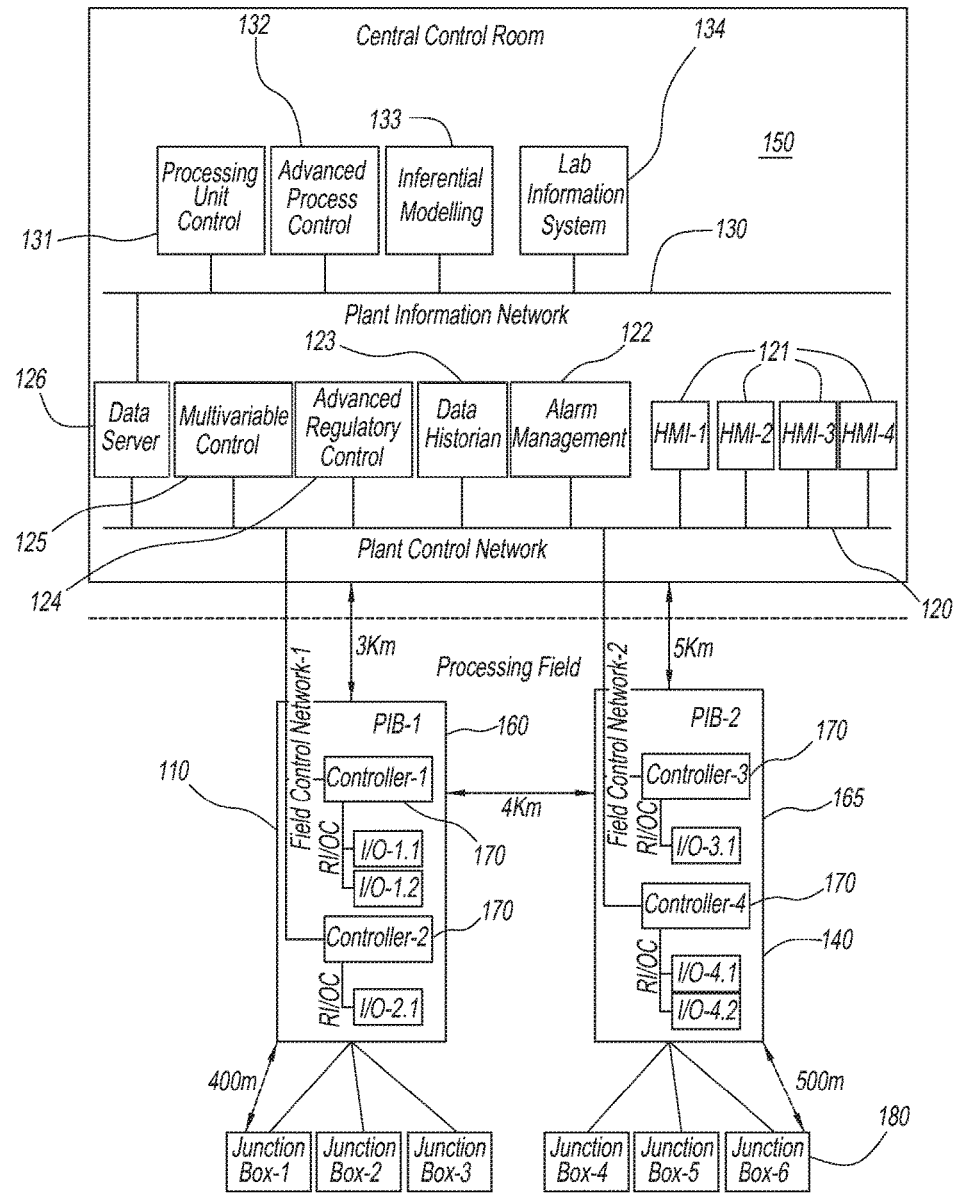
FIG. 4 is a block diagram of a distributed control system architecture according to an embodiment.

Middleware is a collection of technologies and services that enables the integration of subsystems and applications across an overall system. Several standardization efforts in many aspects of middleware technologies resulted in different classifications of the middleware solutions. A broad approach middleware classification based on the types of heterogeneity including platform, programming language, and communication connectivity is described by Medvidovic. See N. Medvidovic, *The Role of Middleware in Architecture-Based Software Development*, International Journal of Software Engineering and Knowledge Engineering 13/4 (2003), pp. 367-393, incorporated herein by reference in its entirety.

Another paper classified the middleware based on its capabilities in meeting non-functional requirements, including capabilities to provide communication among heterogeneous components, extend its functionalities using an open interface, sustain system performance with higher loads in the future, recover from hardware or software failures, provide security policies and mechanisms, guarantee quality of service (QoS) for real-time applications, and cope with changes in the applications and/or user requirements. See C. Mascolo, S. Haile, L. Lymberopoulos, G. Picco, P. Costa, G. Blair, P. Okanda, T. Sivaharan, W. Fritsche, M. Karl, M. Ronai, K. Fodor, and A. Boulis, *Survey of Middleware for Networked Embedded Systems*, Sixth Framework Program Priority 2, Information Society technologies, IST-004536-RUNES-D5.11.0, pp. 1-83, (2005), incorporated herein by reference in its entirety. Many architectural models used in the development of middleware systems are found in literature. Most of the architectures have evolved from point-to-point, client-server, and publish-subscribe models.

A point-to-point model is a tightly coupled form of communication. Transmission Control Protocol (TCP) is a point-to-point network protocol designed in the 1970s. While it provides reliable and high bandwidth communication, TCP is cumbersome for systems with many communicating nodes. See F. Chen, and T. Repantis, *Coordinated Media Streaming and Transcoding in Peer-To-Peer Systems*, 19th International Parallel and Distributed Processing Symposium, (2005), pp. 56b, incorporated herein by reference in its entirety.

To address the scalability issues of the Point-to-Point model, developers turned to the client-server model for centralized information and distributed applications. Many other paradigms are built upon it. The current client-server communication model utilized for integrating highly interactive heterogeneous process control applications across the vertical and horizontal network layers is not effective for exploiting the processing facilities to achieve maximum yield. The information is being generated at multiple nodes and the client-server model is inefficient and precludes deterministic communications, since the client does not know when new information is available. See W. Heinzelman, A. Murphy, H. Carvalho and M. Perillo, *Middleware to Support Sensor Network Applications*, IEEE Network Magazine, 18 (2004), incorporated herein by reference in its entirety.

A solution to the above limitation on client-server models for real-time systems when information is being generated at multiple nodes is to adopt a publish-subscribe communication model. In this model, computer applications subscribe to data that is needed and publish data for sharing. Messages pass directly between the publisher and the subscribers, rather than moving into and out of a centralized server. Most time-sensitive information intended to reach many entities is sent by publish-subscribe systems. Examples of publish-subscribe systems in everyday life include television, magazines, and newspapers. This direct and simultaneous communication among a variety of nodes makes publish-subscribe network architecture a good choice for systems with complex time-critical data flows, even in the presence of unreliable delivery mechanisms. See L. Zhai, L. Guo, X. Cui and S. Li, *Research on Real-time Publish/Subscribe System supported by Data-Integration*, Journal of Software, 6/6 (2011) pp. 1133-1139, incorporated herein by reference in its entirety.

An important effort to standardize publish-subscribe middleware is the development of a Data Distribution System (DDS) specification by Object Management Group, Inc. (OMG). Data-centric publish-subscribe standard is the portion of the OMG DDS specification that addresses the specific needs of real-time data-critical applications and describes the fundamental concept supported by the design of the application programming interface. It focuses on the distribution of data between communicating applications, and provides several mechanisms that allow application developers to control how communication works and how the middleware handles resource limitations and error conditions. The communication is based on passing data of known types in named streams from publishers to subscribers. In contrast, in object-centric communications, the fundamental focus is the interface between the applications. See G. Pardo-Castellote, *OMG Data-Distribution Service: Architectural Overview*, Real-Time Innovations, Inc., (2005), pp. 1-7; and K. An, A. Gokhale, D. Schmidt, S. Tambe, P. Pazandak and G. Pardo-Castellote, *Content-based Filtering Discovery Protocol (CFDP): Scalable and Efficient OMG DDS Discovery Protocol*, DEBS '14, (2014), pp. 1-12, each incorporated herein by reference in their entirety.

An object-centric system consists of interface servers and interface clients. Communication is based on clients invoking methods on named interfaces that are serviced by the corresponding server. Data-centric and object-centric communications are complementary paradigms in a distributed system, and some applications may require both. However, real-time communication often fits a data-centric model more naturally. For example, real-time automation control systems often require specific features including efficiency, determinism, flexibility delivery bandwidth, fault-tolerant operation, and real-time DDS interoperability. See G. Pardo-Castellote, *Data-Centric Programming Best Practices: Using DDS to Integrate Real-World Systems*, Real-Time Innovations, Inc., (2010), pp. 1-18; and L. Zou, Z. Wang, H. Dong, Y. Liu and H. Gao, *Time-and Event-Driven Communication Process for Networked Control Systems: A Survey*, Hindawi Publishing Corporation, Article ID 261738 (2014), pp. 1-10, each incorporated herein by reference in their entirety. Each of these features is briefly discussed herein.

Efficiency: Real-time systems require efficient data collection and delivery. Only minimal delays should be introduced into the critical data-transfer path. A publish-subscribe model is more efficient than a client-server model in both latency and bandwidth for periodic data exchange. A publish-subscribe architecture greatly reduces the overhead required to send data over the network compared to a client-server architecture. Occasional subscription requests at low bandwidth replace numerous high-bandwidth client requests. Latency is also reduced, since the outgoing request message time is eliminated. As soon as a new publication data sample becomes available, it is sent to the corresponding subscriptions.

Determinism: Real-time automation applications are concerned with the determinism of delivering periodic data as well as the latency of delivering event data. When buffers are introduced into a data stream to support reliable connections, new data may be held undelivered for an unpredictable amount of time while waiting for confirmation of old data to be received. Since publish-subscribe does not inherently require reliable connections, implementations can provide configurable trade-offs between the deterministic delivery of new data and the reliable delivery of all data. See G. Buttazzo, *Hard Real-Time Computing Systems: Predictable Scheduling Algorithms and Applications* (Springer, 2011), incorporated herein by reference in its entirety.

Flexibility Delivery Bandwidth: Typical real-time control systems include both real-time and non-real-time nodes. The bandwidth requirements for these nodes are different. For example, an application may be sending data samples faster than a non-real-time application is capable of handling. However, a real-time application may want the same data as fast as it is produced. Data-centric publish-subscribe allows subscribers to set individual limits on how fast data should be delivered to each subscriber for the same data. This is analogous to some people receiving a newspaper every day, while others can subscribe to a weekend paper only. See K. Ramamritham and S. Son, *Real-time databases and data services*, Real-Time Systems, 28/2 (2004), pp. 179-215, incorporated herein by reference in its entirety.

Fault-Tolerant Operation: Real-time automation applications are required to run in the presence of component failures. Often, those systems are safety critical or carry financial penalties for loss of service. The applications running in those systems are usually designed to be fault-tolerant using redundant hardware and software. Backup applications are often "hot" and interconnected to primary systems, which can take over as soon as a failure is detected. A publish-subscribe model is capable of supporting many-to-many connectivity with redundant publishers and subscribers. This feature is desirable for constructing fault-tolerant or high availability applications with redundant nodes and robust fault detection and handling services. See M. Mahmoud and Y. Xia, *Analysis and Synthesis of Fault-Tolerant Control Systems* (Wiley, 2014), incorporated herein by reference in its entirety.

Real-Time DDS Interoperability: With the increasing adoption of DDS in large distributed systems, it is desirable to define a standard wire protocol that allows DDS implementations from multiple vendors to interoperate. OMG developed the real-time DDS interoperability wire protocol specification to ensure that information published on a topic using one vendor's DDS implementation is consumable by one or more subscribers using different vendor's DDS implementations. The DDS wire protocol is capable of taking advantage of the quality of service settings configurable by DDS to optimize its use of the underlying transport capabilities. In particular, it is capable of exploiting the multicast, best-effort, and connectionless nature of many of the DDS quality of service settings. See Object Management Group, *Data Distribution Service for Real-Time Systems Specification*, Version 1.2, (2007), incorporated herein by reference in its entirety.

Embodiments herein disclose systems and methods which move away from the multiple-network-layer architecture and away from the data centralization at the controllers and data servers. The invention includes replacing the main control module with a standard real-time server. The input/output racks are physically and logically decoupled from the controller by converting them into distributed autonomous process interface systems in embodiments described herein. The invention also includes real-time data distribution service middleware to provide seamless cross-vendor interoperable communication among all process control applications and distributed autonomous process interface systems. In addition, embodiments herein describe a virtually clustered automation platform using COTS components, which provide a standard and vendor-independent platform.

Embodiments described herein replace the proprietary control module with a server-based controller running on a real-time operating system environment. The controller can be located at the server room of the CCR. Real-time reliable and fault tolerant publish-subscribe data-centric middleware provides a seamless cross-vendor interoperable communication between the controller and the distributed autonomous process interface systems.

Figure 5:
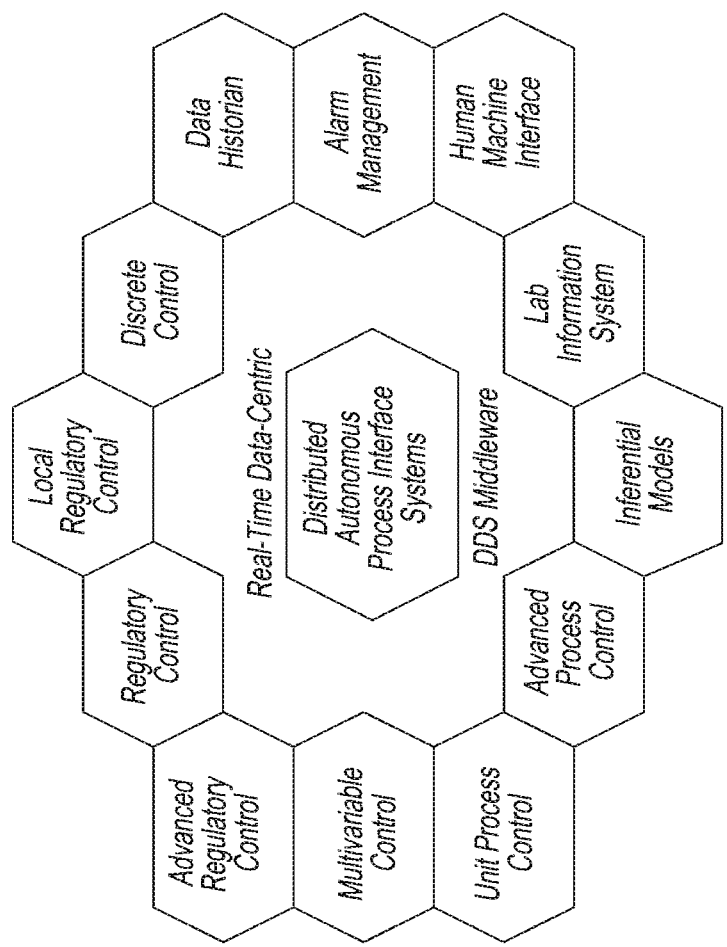
FIG. 5 illustrates a collaborative automation platform according to an embodiment.

The above modularity concept results in the development of a collaborative automation platform centered on distributed autonomous process interface systems and real-time DDS middleware to provide effective and efficient publish-subscribe communication among all process control applications. FIG. 5 illustrates a collaborative automation platform in which real-time data-centric DDS middleware bridges the distributed autonomous process interface systems with multiple control applications.

Figure 6:
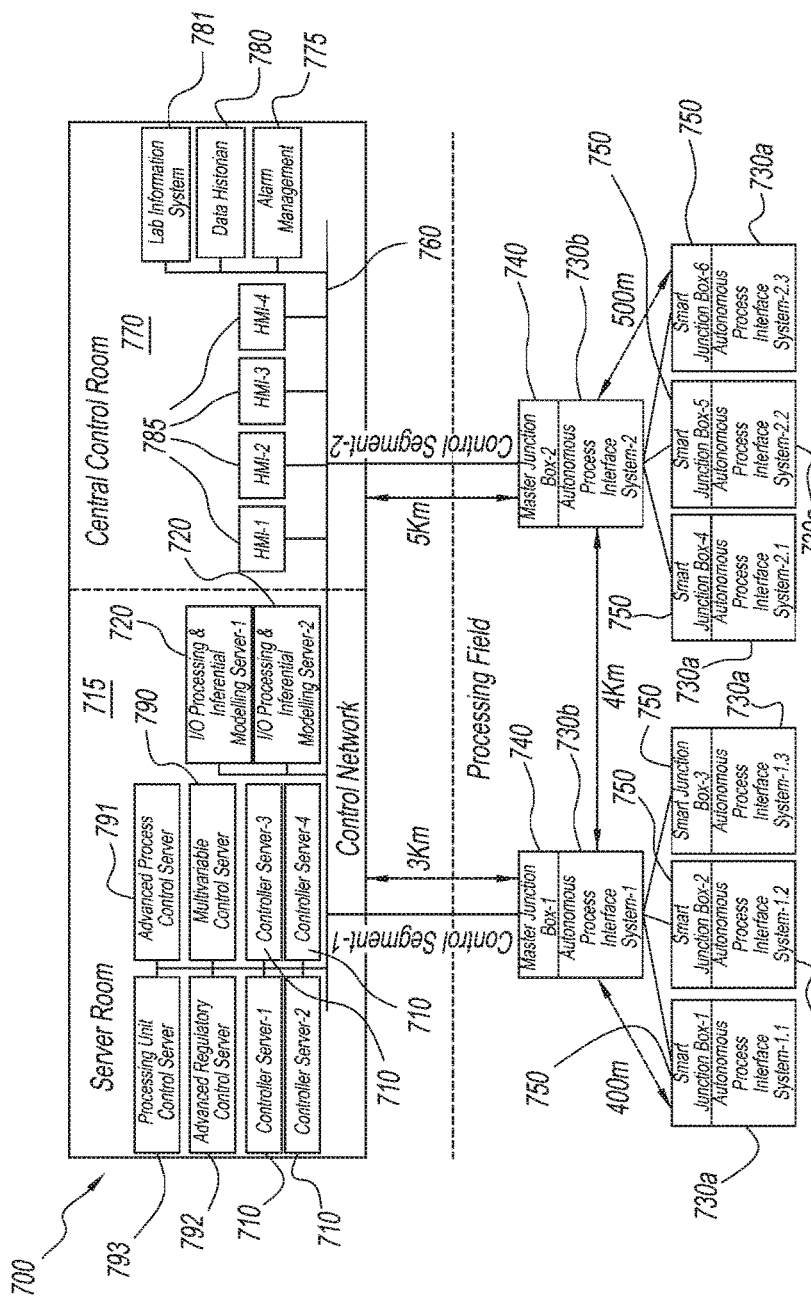
FIG. 6 is a block diagram of a collaborative automation system architecture according to an embodiment.

FIG. 6 is a block diagram of a collaborative automation system architecture 700 according to embodiments described herein. The controller architecture includes control servers 710 and I/O processing and inferential modeling servers 720 housed in a server room 715, and distributed autonomous process interface systems 730a and 730b, all of which are empowered by real-time reliable and fault tolerant DDS middleware. The control servers 710 host software-based control applications ranging in control complexity from basic discrete control up to advanced process control. In FIG. 6, all field instruments are hardwired to field junction boxes close to the associated process equipment. Junction boxes include master junction boxes 740 and smart junction boxes 750.

Each smart junction box 750 includes terminal strips to interface with the wiring cables connecting the electrical signal paths from the associated instruments and field devices to the autonomous process interface system 730a with required I/O modules to condition and convert the electrical signals to digital data. Each smart junction box 750 also includes a DDS-enabled communication adapter with dual Ethernet communication ports. The smart junction boxes 750 can be located within 50 meters from the processing equipment requiring control, as an example.

Figure 7:
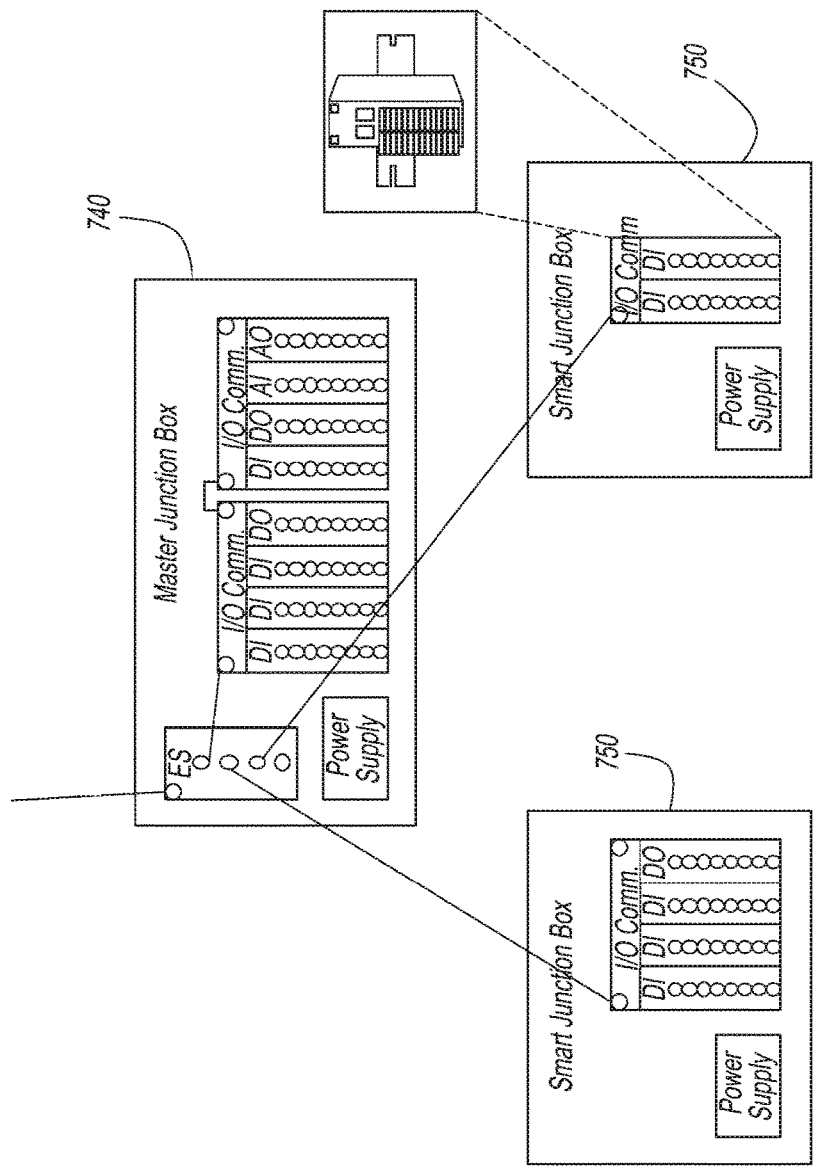
FIG. 7 illustrates a master junction box and smart junction box relationship according to an embodiment.

The master junction box 740 is similar to the smart junction box 750 with an additional Ethernet switch, as illustrated in FIG. 7 in a master junction box and smart junction box relationship. Its location is selected to be close to the center of a large number of smart junction boxes 750 in order to minimize cabling cost. The Ethernet switch uplink within each master junction box 740 can be a control segment extended from the local area control network 760 in the CCR 770.

Each autonomous process interface system 730a and 730b corresponds to a standalone DDS-enabled I/O system with required hardware for connecting various filed process measurement and control devices, such as pressure, flow, level, and temperature instruments, motion sensors, position sensors, and final device elements, such as motor-operated gate valves and control valves for regulating the process pressure, flow, level or temperature. Three types of autonomous process interface systems 730a and 730b include COTS I/O system, proprietary I/O system, and I/O bus networks. Each type is independent of the type of controller server and its manufacturer. In an embodiment, a COTS I/O system is a primary component of the collaborative automation system 700 for automation applications.

The COTS I/O systems can be used primarily for data acquisition and to a lesser extent, for supervisory control through the web. Three types of physical configurations include compact modules, fixed-type modules, and mixed-type modules. The compact modular I/O system can include mixed types of I/O channels and a fixed number of I/O channels. The fixed-type modular I/O system can include specific types of I/O channels and a fixed number of modules with a fixed number of I/O channels. The mixed-type modular I/O system can include any types of I/O modules, but a fixed number of modules with a different number of I/O channels.

Process interface systems become autonomous when they are self-contained and can run without the need for a controller, specifically when it functions as a linking device for field bus networks. Each autonomous process interface system can be associated by one or more software-based controllers, as required. This has a significant advantage over the conventional control system architecture where a physical one-to-one relationship exists between the controller and its I/O racks. For example, if certain I/O signals of a conventional control system architecture are required for control strategies in two different controllers, the I/O signals are hardwired to both controllers through optical isolators.

Each operation area of the collaborative automation system 700 is assigned one I/O processing and inferential modeling server 720 to process the I/O signals of the associated autonomous process interface systems 730a and 730b and to infer unmeasured process properties required for the advanced process control applications. The function of the I/O processing and inferential modeling server 720 is to acquire the latest status changes of all hardwired input signals in the associated autonomous process interface systems 730a and 730b. It is also the function of the I/O processing and inferential modeling server 720 to record the sequence of events, generate applicable alarms via an alarm management module 775, and publish the changed values to all subscribers requesting the latest updates, including a data historian 780, a lab information system 781, and HMI consoles 785 of the CCR 770. In addition, the I/O processing and inferential modeling server 720 publishes the inferred process properties to all subscribers transmitted from a multivariable controller 790, an advanced process controller 791, an advanced regulatory controller 792, and a processing unit controller 793 of the server room 715 through the middleware.

Each controller hosts a single control application running continuously on a real-time operating system. The real-time control middleware layer is the center of the collaborative automation platform architecture and is based on DDS middleware technology. The middleware connects the software-based control applications, I/O processing servers, distributed process interface systems, and the HMI consoles. The communication relationships among publishers and subscribers are summarized in Table 1.

TABLE 1

Publish/Subscribe Relationship of Topics

| Publishers | Topics | Subscribers | | | | | | | | | |
|---|---|---|---|---|---|---|---|---|---|---|---|
| | | 1 | 2 | 3 | 4 | 5 | 6 | 7 | 8 | 9 | 10 |
| 1 | Operation Commands | | X | | | | | | | | |
| | Override Commands | | | | X | | | | | | |
| 2 | Output Image | | | | X | | | | | | |
| | Sequence of Events | X | | | | | | | | X | |
| 3 | Alarm | X | | | | | | | | | X |
| | Inferred Properties | | | | | | X | X | X | | |
| 4 | Input Image | X | X | X | | X | X | X | X | | |
| 5 | PID Set Points | | X | | | | | | | | |
| 6 | PID Set Points | | X | | | X | | | | | |
| 7 | PID Set Points | | X | | | X | X | | | | |
| 8 | PID Set Points | | X | | | X | X | X | | | |
| | Control Performance | X | | | | | | | | | |
| 9 | HistoricalTrends | X | | | | | | | | | |
| 10 | Alarm | X | | | | | | | | | |

1 HMIs
2 Controllers
3 I/O Servers
4 Process Interface Systems
5 Advanced Regulatory Control
6 Multivariable Control
7 Unit Process Control
8 Advanced Process Control
9 Data Historian
10 Alarm Management Modularity concept was utilized to address the drawbacks of a monolithic mainframe architecture. Modular architecture is a design approach that subdivides a system into smaller parts called modules that can be independently created and used in different systems. A modular system can be characterized by functional partitioning into discrete scalable and reusable modules, use of well-defined modular interfaces, and making use of industry standards for interfaces. Benefits include a reduction in cost due to lesser customization, less learning time, and flexibility in design. Modularity offers other benefits, such as exclusion of obsolete modules and augmentation by merely plugging in different current modules. This idea led to building computers with easily replaceable parts that use standardized interfaces, and also led to upgrading or replacing obsolete aspects of the computer easily without having to buy another computer altogether. The life cycle of this automation solution can be managed and sustained using a replacement-on-failure strategy for all components.

Figure 8:
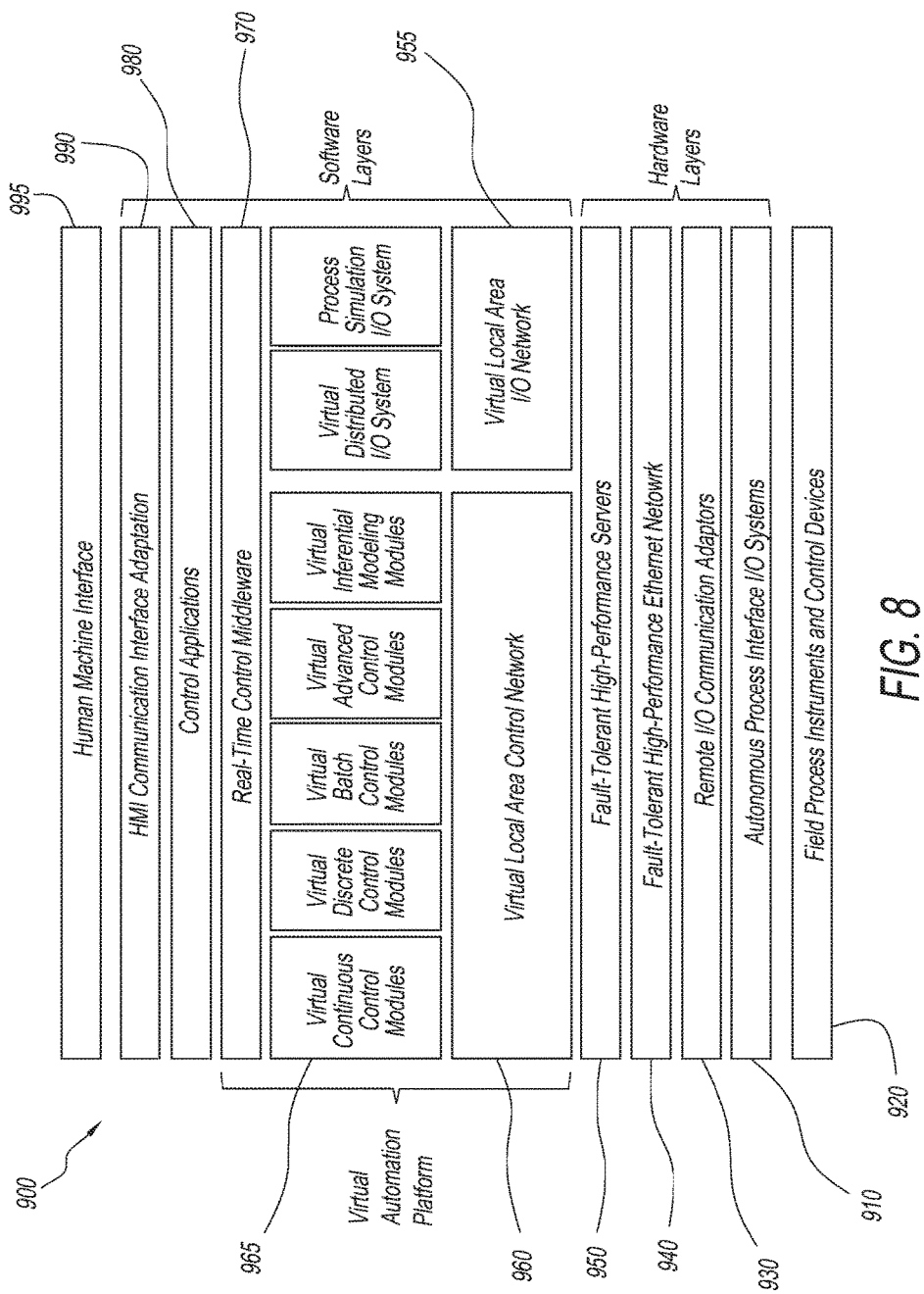
FIG. 8 illustrates a virtually clustered automation platform reference model according to an embodiment.

To achieve this objective, a virtual clustered automation platform, or vCAP reference model has been developed and applied in the design of the automation controllers to allow any upgrades or replacements of obsolete components without having to buy another automation controller. This inventive conceptual reference model characterizes the internal functions of an open and vendor-independent automation controller by partitioning it into multiple layers as illustrated in FIG. 8. The first four layers are physical hardware layers and the remaining are logical software layers. Each layer is independent of the other layers and the required modifications in each layer are independent of any in-progress modifications within the other layers. Each layer hides the implementation details of a particular set of functionality. It helps to decouple the I/O system from the associated controller. Each layer conceals all different I/O systems from the controllers by providing a uniform interface to all autonomous process interface I/O systems including COTS I/O systems, proprietary I/O legacy systems, and all I/O bus networks connected directly to field devices. This model will avoid the requirement to modify the control system when varying I/O hardware architecture.

Changes in the main controller architecture also do not require any modifications to the I/O hardware system. This provides a higher degree of decoupling when compared to the conventional proprietary PLC and associated I/O system. In an embodiment of the invention, the vCAP includes four virtual components empowered by real-time control middleware, which include a virtual control system, a virtual I/O system, a virtual I/O network, and a virtual control network. FIG. 8 illustrates a virtually clustered automation platform reference model. The virtual clustered automation platform 900 has primarily three sections, which include hardware layers, software layers, and a virtual automation platform.

The autonomous process interface systems layer 910 corresponds to the standalone distributed I/O systems of all required I/O hardware for connecting various field process measurement and control devices 920 including pressure, flow, level, and temperature instruments, motion sensors, position sensors, and final device elements such as motor operated gate valves and control valves to regulate the process pressure, flow, level or temperature. Field instruments are hardwired to the field junction boxes close to the associated process equipment. The autonomous I/O systems are not statically associated with the virtual controllers. I/O systems can be associated by one or more virtual controllers dynamically, as required. Three types of process interface I/O systems are included in this layer, which are independent of the controllers and their manufacturers. These include a COTS I/O system, an existing proprietary I/O system, and an I/O bus network. The I/O modules can be simplex for non-critical I/O signals and redundant for critical I/O signals depending on the required reliability and availability.

The remote I/O communication adaptors layer 930 ensures that all I/O systems in the layer underneath it are capable of interfacing to simplex or redundant Ethernet communication links depending on the required reliability and availability. This adaptation layer abstracts the complexity of the communication interface to all I/O systems by transforming them to standard Ethernet communication links. The fault-tolerant high-performance Ethernet network layer 940 defines the physical local area network (LAN) architecture for interconnecting the I/O systems and the required fault-tolerant servers, as well as the required HMI PCs. The design of this layer can be simplex Ethernet network for non-critical application, parallel Ethernet network for single-fault tolerant application, or fault-tolerant Ethernet network for multi-faults tolerant application depending on the required reliability and availability. The remote I/O communication adaptors layer 930 and the fault-tolerant high-performance Ethernet network layer 940 provide an inventive mechanism for vendor-independent interoperable communication between the controller side and the field processing side of an industrial system, as described by embodiments herein.

The fault-tolerant high-performance servers layer 950 defines the requirements for the required computing platforms to emulate the distributed hardwired I/O systems and associated controllers. Fault-tolerant computing is the ability to provide demanding workloads with 99.999% system uptime or better, zero failover time, and no data loss. The fault-tolerant server is required to guarantee zero downtime and maximum performance, prevent data loss and corruption including in-flight data, enable virtualization for applications, support real-time and high-volume workloads with ease, and accommodate network and transaction growth. A minimum of two fault-tolerant high-performance servers are required for I/O system processing and for control processing. The servers can be configured to be simplex for non-critical application, spare-standby for application that can tolerate few hours shutdown, cold-standby for application that can tolerate few minutes shutdown, hot-standby that can tolerate few seconds interruption, or fault-tolerant that does not tolerate any interruption depending on the required reliability and availability.

The virtual LAN layer defines the requirements of creating two virtual LANs, one dedicated for distributed I/O processing and another one dedicated for control applications. A virtual LAN can be created by partitioning a physical LAN into multiple mutually-isolated logical LANs using a virtual LAN identification. Grouping network nodes with a common set of requirements regardless of their physical location by virtual LAN can greatly simplify network design. A virtual LAN has the same attributes as a physical LAN, but it allows for end stations to be grouped together more easily, even if they are not on the same network switch. Virtual LAN membership can be configured through software instead of physically relocating devices or connections. Without virtual LANs, a switch considers all interfaces on the switch to be in the same broadcast domain. The physical fault-tolerant high-performance Ethernet network is partitioned into two virtual LANs, including a virtual local area I/O network 955 and a virtual local area control network 960.

A virtual controller layer 965 defines the main virtual computing engines required for a comprehensive virtual distributed control system environment. The I/O system server is virtualized into multiple operation areas. The control server is virtualized into multiple virtual control modules. The virtual control applications and I/O systems can be distributed into multiple physical fault-tolerant control and I/O servers to sustain the applications performance. The interaction among the virtual and physical servers is processed through the real-time control middleware.

The real-time control middleware layer 970 is the heart of the virtual automation controller architecture of the invention and is based on the DDS middleware technology. This middleware serves as a glue to connect the virtual distributed I/O systems, the virtual controllers, the HMIs, and the offline process simulation I/O system. This technology allows for decoupling the I/O systems from the controllers. Therefore, dynamic soft association is provided between the I/O system and the controller, as opposed to a static and physical association in the conventional proprietary PLCs.

When new process measurements are required from equipment located far from the associated controller but close to a nearby controller handling different processes, wiring for these new measurements cannot be hardwired to the nearby controller when utilizing conventional proprietary PLCs. Instead, wiring for these new measurements must be hardwired to the associated controller where the control application resides, regardless of the associated capital cost. On the other hand, the usage of real-time DDS middleware technology provides the flexibility of decoupling the I/O systems from the virtual controllers. Wiring for these new measurements can be hardwired to the nearby I/O system and the new measurements can be associated with the applicable virtual controller through the middleware publish/subscribe relationship process. Switching between the simulation environment and the real hardware environment is completely transparent to the control logic because of the I/O system hardware abstraction.

The control applications layer 980 defines the application programming environment for all types of virtual controllers. The control applications can use the IEC 61131-3 standards-based programming languages including function block diagram, ladder logic diagram, structured text, instruction list, and sequential function chart, for example.

A HMI communication interface adaptation layer 990 defines the required gateway convertor from Ethernet-based network to the proprietary control network of the DCS or SCADA systems, which interacts via a human machine interface (HMI) 995.

The architecture of the vCAP has evolved from the advancement in virtual fault-tolerant computing and networking, as well as real-time middleware technologies. An embodiment for a virtually clustered automation platform architecture is given. The architecture includes six components of a virtual control system, a virtual I/O system, HMI data servers, real-time control middleware, virtual communication networks, and autonomous process interface I/O systems distributed among multiple junction boxes.

The following design criteria were included in the vCAP.

Reliability—vCAP is based on fault-tolerant computing servers and a fault-tolerant Ethernet LAN, utilized for virtualized mission-critical applications.

Scalability—vCAP is highly scalable, based on a virtually distributed architecture where I/O modules, the CPU, and the control applications are not interwoven. Systems can grow by adding multiple virtual machines and/or multiple high-performance fault-tolerant servers for both control and I/O systems. Also, any changes to the process I/O electrical signals do not have any impact on the control applications.

Performance Sustainability—vCAP is a high-performance controller because of the decoupling of the I/O systems from the controller and the utilization of virtual networks for segregating the I/O services from the control activities. The I/O scan update can be processed during the control application scan cycle.

Flexibility—vCAP can capitalize on existing I/O systems of unsupported legacy controllers and provide a cost effective I/O replacement, based on failure module by module or channel by channel. This feature can reduce up to 75% of the capital investment for addressing the obsolescence challenges.

Maintainability—vCAP is a cost effective evergreen solution because it is based on field-proven interoperable and standard COTS software and hardware components, resulting in an optimum capital investment for the total cost of ownership throughout the life span of the system.

Testability—vCAP does not require the actual hardware of the I/O systems to be located at the factory during the testing and verification phase, leading to an accelerated project schedule during construction and system installation. Furthermore, testing and troubleshooting the I/O systems are independent from testing and troubleshooting the controllers.

Security—vCAP is a highly secured platform with centralized security layers of protection with consistent policies across all servers, which is similar to the security layers used for cyber security of critical data centers.

Collaborative—vCAP has a standard control communication network, providing tight real-time collaboration among all control level applications, including regulatory control, advanced regulatory control strategies, multivariable advanced control, and real-time control optimization. It can also be seamlessly integrated to any open systems including DCS, SCADA, and corporate enterprise resource planning applications.

Cost Effective—vCAP reduces initial capital investment for grass root projects since it does not require any PIBs and associated system and marshaling cabinets, as well as expensive cable wiring from PIBs down to the scattered junction boxes.

Economy of Scale/Utilization—vCAP is based on virtual machines that can achieve high utilization, since the I/O systems are autonomous and completely independent of the virtual controllers. Adding additional virtual controllers does not require any capital investment for the hardware, resulting in maximum total value of ownership.

A description is given hereunder in which embodiments of the invention were tested and evaluated, with reference to FIGS. 9-26. A testing methodology can include the following.

Implementing a small scale prototype of the virtually clustered automation platform to test its performance compared to a conventional proprietary PLC.

Implementing a software-based simulation model in a large scale to demonstrate the performance sustainability of the virtually clustered automation platform, while growing in size based on the number of field I/O signals and the number of nodes.

Figure 9:
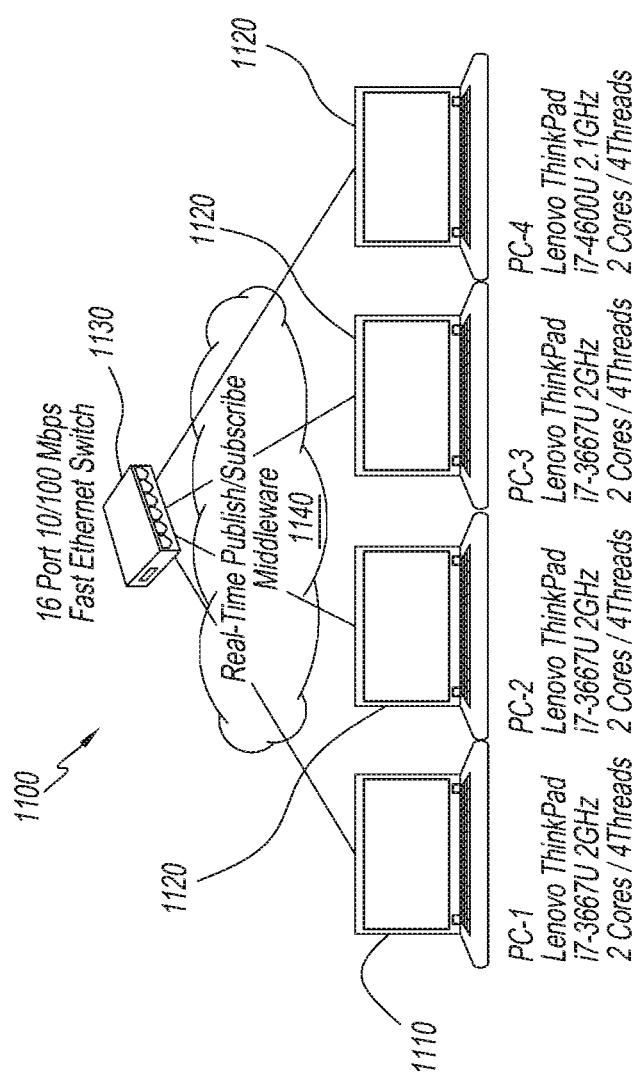
FIG. 9 illustrates a COTS-based automation controller according to an embodiment.

Embodiments described herein for a collaboration automation platform were evaluated empirically using a software-based simulation model to demonstrate its performance sustainability while growing in size, based on the number of I/O signals. FIG. 9 illustrates a COTS-based automation controller of an exemplary model setup 1100, which can include one 2.1 GHz Lenovo i7-4600U Thinkpad 1110, three 2 GHz Lenovo i7-3667 Thinkpads 1120, and one 16-port 10/100 Mbps fast Ethernet switch 1130. The model setup 1100 is given for illustrative purposes only. Real-time Connext DDS professional middleware 1140 version 5.1.0.14-i86Win32VS2013 from Real-Time Innovations, Inc. was installed in all Lenovo Thinkpad laptops 1110 and 1120. The four laptops 1110 and 1120 are connected to the 16-port 10/100 Mbps fast Ethernet switch 1130. Other model setups 1100 could be used and are contemplated by embodiments described herein.

DDS QoS policies for real-time systems can be used to control and optimize networks, as well as computing resources to ensure the right information is delivered to the right subscriber at the right time. Default values were used with the following exceptions to meet the requirement of the automation controller design.

Reliability: The reliability QoS policy indicated a level of guarantee offered by the DDS in delivering data to subscribers. Possible variants are a reliable parameter and a best effort parameter. With the selection of reliable parameters in a steady-state, the middleware guarantee included that all samples in the publisher history will eventually be delivered to all the subscribers. However, the best effort parameter indicated that it was acceptable to not retry propagation of any samples. The reliable parameter was selected in this experiment.

Durability: The durability QoS policy controls the data availability with respect to late joining publishers and subscribers. Specifically, the DDS provided variants of volatile, transient local, transient, and persistent. With the volatile option, there is no need to keep data instances for a late joining subscriber. With the transient local option, the data instance availability for a late joining subscriber is tied to the publisher availability. With the transient option, the data instance availability outlived the publisher. With the persistent option, the data instance availability outlived the system restarts. The durability service QoS policy was used to configure the history QoS policy. The resource limits QoS policy used by the fictitious subscriber and publisher were used by the persistence service, responsible for implementing the durability QoS policy options of transient and persistence. The persistent option was selected in this experiment.

History: The history QoS policy controls whether the DDS should deliver only the most recent value, attempt to deliver all intermediate values, or do something in between. The policy can be configured to provide how many data samples it should keep, whether to keep the last or to keep them all. With the keep last option, the DDS will only attempt to keep the most recent depth samples of each instance of data identified by its key. However, with the keep all option, the DDS will attempt to keep all the samples of each instance of data identified by its key. The keep all option was selected in this experiment.

Ownership: The ownership QoS policy specifies whether it is allowed for multiple publishers to write the same instance of the data and if so, how these modifications should be arbitrated. Possible options include shared and exclusive. With the shared option, multiple publishers are allowed to update the same instance and all the updates are made available to the subscriber. However, the exclusive option indicates that each instance can only be owned by one publisher, but the owner of an instance can change dynamically due to liveliness changes. The selection of the owner is controlled by setting the ownership strength QoS policy. The ownership strength QoS policy specifies the value of the strength used to arbitrate among publishers that attempt to modify the same data instance. The policy applies only if the ownership QoS policy is set to exclusive. The exclusive option was selected in this experiment.

The focus of the empirical test was to validate the viability of using real-time DDS middleware to exchange required interaction traffic among the control applications and the autonomous process interface systems for safe and reliable operation of the processing facilities. The measuring performance criteria used were average latency and throughput.

The communication test between a publisher and a subscriber can be setup as follows. The I/O system is the publishing side and the control application(s) is the subscribing side. The publishing side writes data, a total of 30 million data samples, to the middleware as fast as it can. Every time, after writing 1000 data samples to the middleware, it sends a special sample requesting an echo from the subscribing side. On one hand, the publishing application publishes throughput data and at the same time it also subscribes to the latency echoes. On the other hand, the subscribing applications subscribe to the throughput data, in which the echo requests are embedded, and they also publish the latency echoes.

The publisher used the request for an echo exchange to measure the round-trip latency. The time stamp was logged by the publisher from the start of sending the data sample request until it received the echo of the data sample back from the subscriber. The communication latency between a publisher and a subscriber is one-half of the round-trip latency. The average communication latency between a publisher and a subscriber is the average of the 30,000 times of latency measurement during one test. The reason for measuring the round-trip latency rather than one-way latency is to overcome the challenge of ensuring accurate clock time synchronization between the publisher and the subscriber.

The publisher used the request for an echo exchange to measure the roundtrip latency. Two methods for measuring the communication latency when there is one publisher and many subscribers include a unicast scenario and a multicast scenario.

Figure 10:
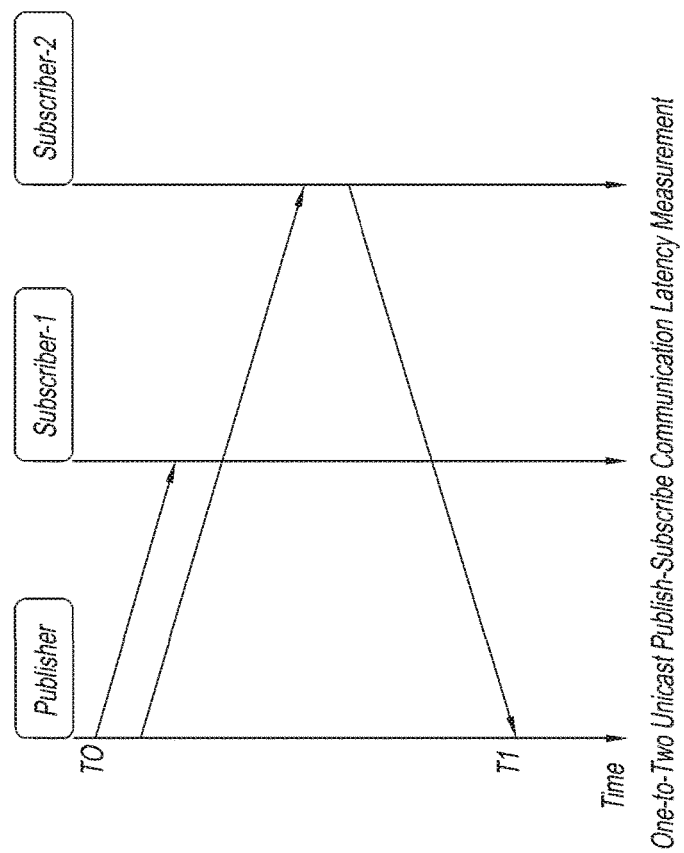
FIG. 10 illustrates a one-to-two unicast publish-subscribe communication latency measurement according to an embodiment.

Unicast Scenario: The time stamp was logged by the publisher from the start of sending the data sample request consecutively to all subscribers until it received the echo of the data sample back from the last subscriber. FIG. 10 illustrates a one-to-two unicast publish-subscribe communication latency measurement. The communication latency between a publisher and the last subscriber, i.e. the second subscriber in this case, was estimated by subtracting the one-way communication latency, as determined in a single publisher and a single subscriber case, from the roundtrip time to the last subscriber. In other words, the one-way latency is equal to T1-T0-a one-way latency in a one-to-one unicast case. The average communication latency between a publisher and the last subscriber is the average of the 30,000 times of latency measurement during one test.

Figure 11:
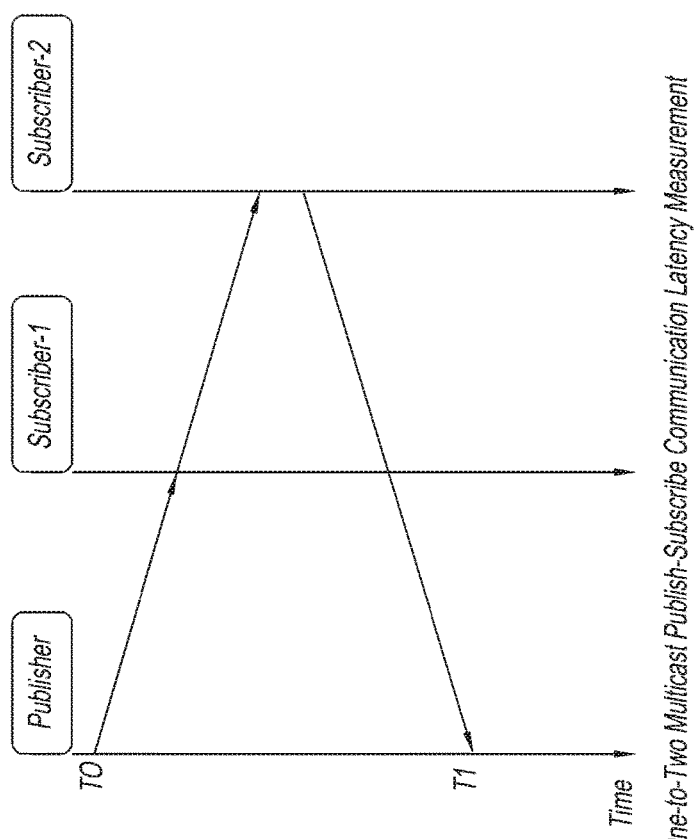
FIG. 11 illustrates a one-to-two multicast publish-subscribe communication latency measurement according to an embodiment.

Multicast Scenario: The time stamp was logged by the publisher from the start of sending the data sample request to all subscribers until it received the echo of the data sample back from the last subscriber. FIG. 11 illustrates a one-to-two multicast publish-subscribe communication latency measurement. The communication latency between a publisher and the last subscriber, i.e. the second subscriber in this case, is estimated by subtracting the one-way communication latency, as determined in a single publisher and a single subscriber case, from the roundtrip time to the last subscriber. In other words, the one-way latency is equal to T1-T0-a one-way latency in a one-to-one multicast case. The average communication latency between a publisher and the last subscriber is the average of the 30,000 times of latency measurement during one test.

Each test scenario was repeated eight times with different data packet sizes of 100, 200, 400, 800, 1600, 3200, 6400, and 12,800 bytes. The change in data size represents the change in the number of I/O signals. The subscriber measured the throughput by counting the number of received data packets per second and the throughput rate of Megabits per second. FIG. 11 illustrates the complete automation controller architecture utilized in the performance testing. All four machines were configured with RTI real-time Connext DDS middleware. An exemplary minimum controller's scan time resolution is 100 ms with a total of 35 ms dedicated for I/O communication services. Therefore, the average communication latency between the controller and the I/O system through the real-time publish/subscribe DDS middleware shall be within 35 ms. The baseline performance test measured the communication latency and throughput of one controller and one I/O system.

Figure 12:
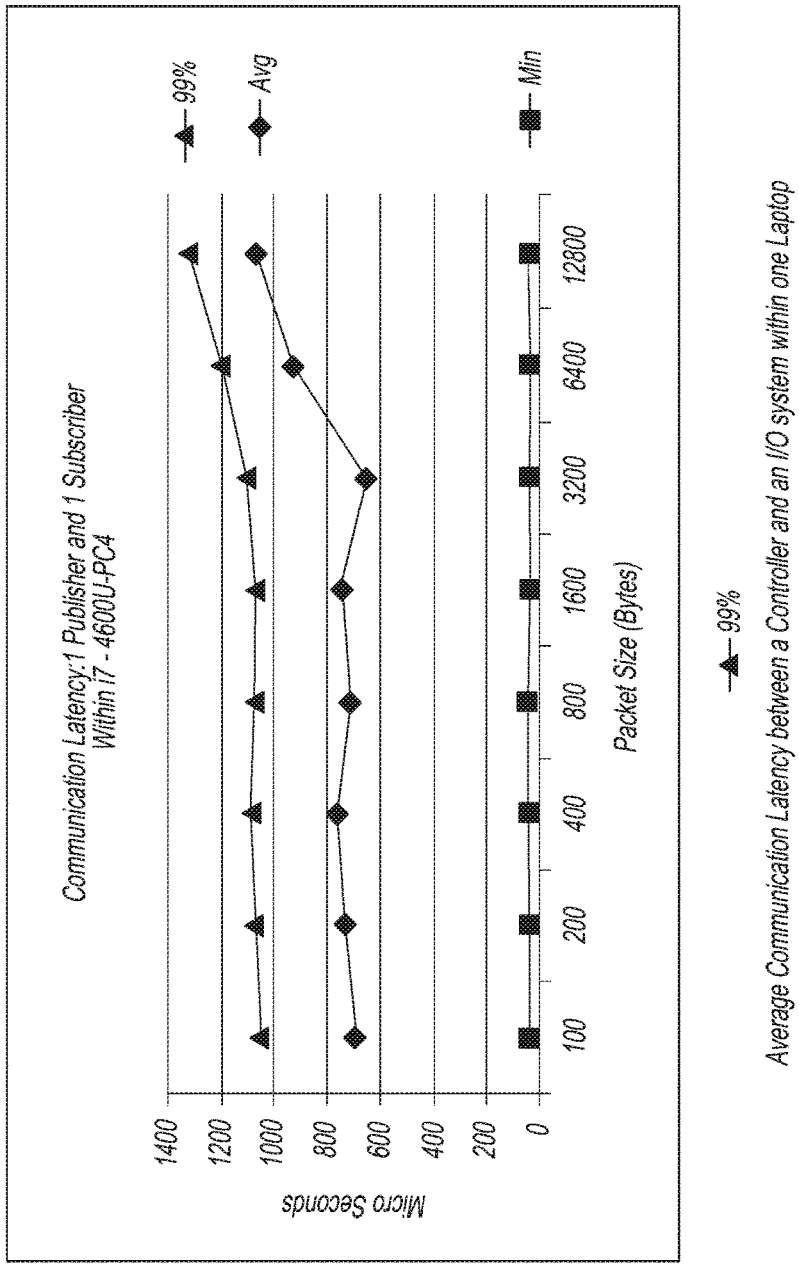
FIG. 12 is a graph of the average communication latency between a controller and an I/O system within one laptop according to an embodiment.

FIG. 12 is a graph of the average communication latency between a controller and an I/O system within one laptop. The performance result of the average communication latency between the controller and the I/O system is within 1 ms, which is well below the required scan time resolution. The controller size was varied from 100 bytes, equivalent to a controller with 400 digital I/O and 50 analog I/O to a controller size of 12,800 bytes, equivalent to a controller with 80,000 digital I/O and 2800 analog I/O. The data shows that communication latency remained consistently low as message size increased. This was a positive result showing that the real-time publish/subscribe DDS middleware was able to cope with the large increase in data loading without any significant impact on the controller performance.

Jitter is the variation in latency as measured in the variability over time of the packet latency across the communication medium. With constant latency, there was no variation or jitter. A system is more deterministic if it exhibits low jitter. In FIG. 12, the square series show the minimum measured latency and the triangle series show the 99th percentile latency. Latency at the 99th percentile means that only 1% of the data samples exhibited latency larger than this value. Even for large packet sizes, the variation between the minimum and the 99% latency remained consistently low. This demonstrates that the real-time publish/subscribe DDS middleware between the controller and the I/O system exhibited low jitter and high determinism, making it suitable for real-time and mission-critical applications.

For the throughput analysis, the publisher sent data to one subscriber application. The performance test went through the following phases.

The publisher signaled the subscriber application that it will commence, and then started its own clock. The duration of the test was based on the number of data samples to be written to the middleware; in this case, it was 30 million packets.

The subscriber started measuring the number of data samples received.

After the desired duration, the publisher signaled the subscriber that the experiment was over. The subscriber divided the number of samples received by the elapsed time to report the throughput observed at the receiver.

Figure 13:
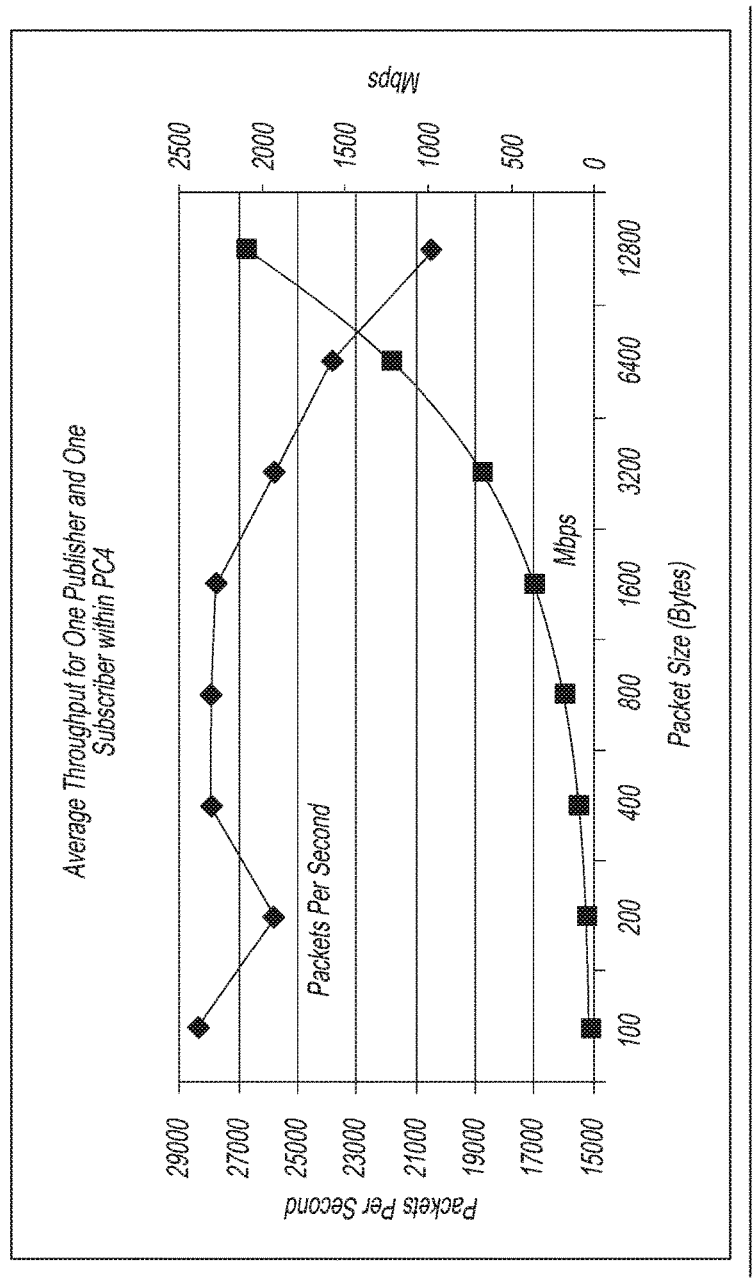
FIG. 13 is a graph of the average throughput for a controller and an I/O system one laptop according to an embodiment.

Maximum throughput was achieved when the publisher sent messages as fast as the subscriber could handle, without dropping a packet. Stated another way, the maximum throughput was obtained somewhere between the publisher sending too slowly, not maximizing the available pipe, and the publisher swamping the subscriber, overflowing the pipe. For this reason, the test included trying a range of sending rates for the publisher. For the absolute maximum throughput to be observed, the optimal sending rate needs to be in the particular range. FIG. 13 is a graph of the average throughput for a controller and an I/O system within one laptop, illustrating the measured average throughput bandwidth between one controller and one I/O system for the fourth laptop measured in packets per second, represented by the diamond series, and Megabits per second, represented by the square series.

The graph demonstrates sustainable publish/subscribe throughput bandwidth between one controller and one I/O system within each laptop in terms of packets per second and Megabits per second. The slight decrease in the throughput in terms of number of packets per second is due to the increase in transmission time of each packet. However, the throughput bandwidth in terms of Megabits per second increases significantly with the increase in the size of the packet. This indicates that the real-time DDS middleware was able to cope with the large increase in data loading, and it fully utilized available data bus communication bandwidth between the controller and the I/O system. Stated another way, the real-time DDS middleware did not impose any inherent limit on the aggregate data messaging capacity, making it suitable for scalable automation platforms.

Figure 14:
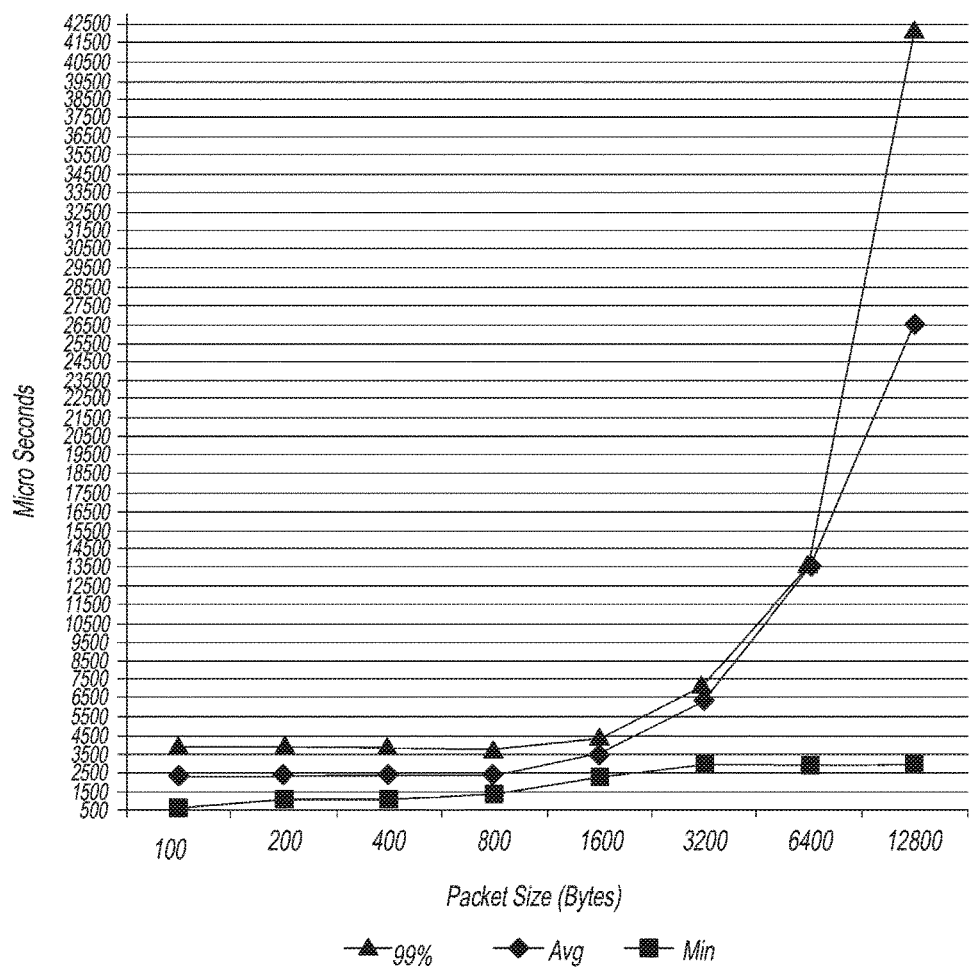
FIG. 14 is a graph of the average communication latency through a 100/Mbps fast Ethernet switch according to an embodiment.
Figure 15:
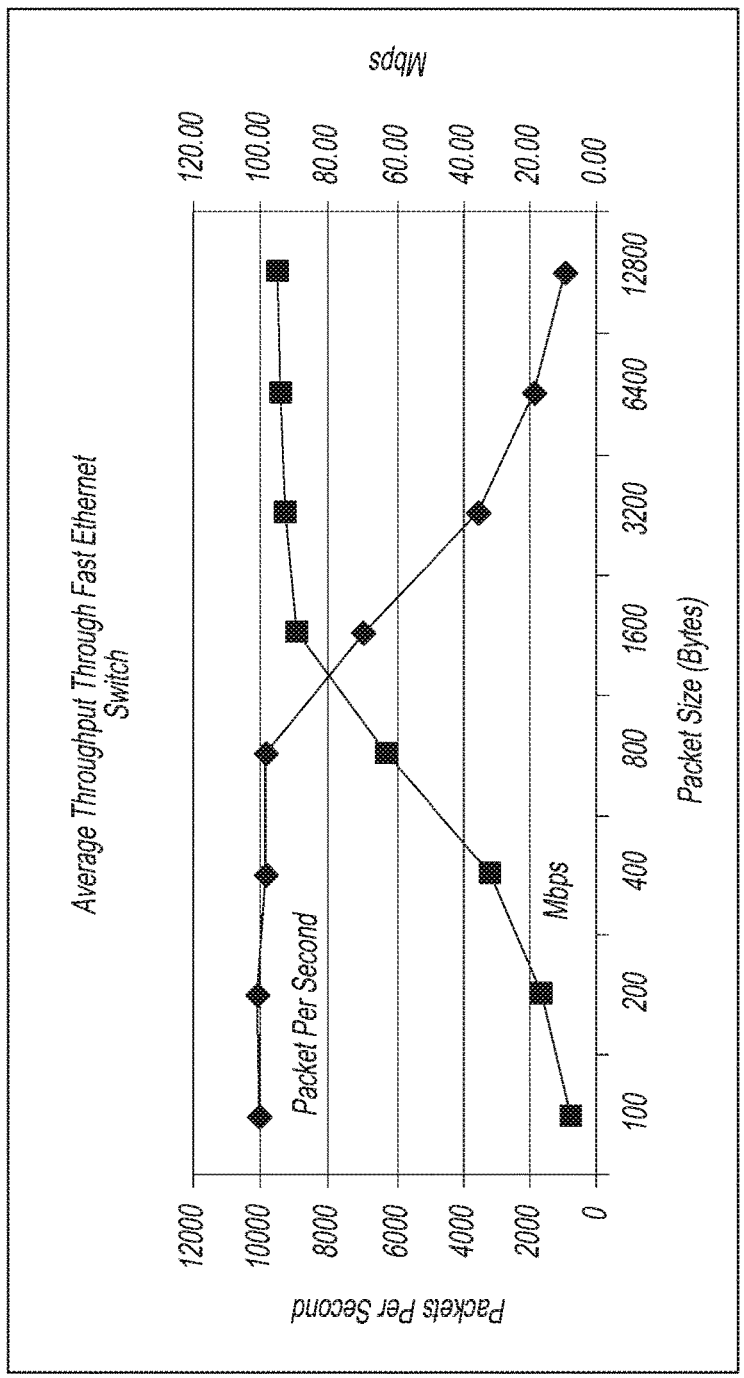
FIG. 15 is a graph of the average throughput performance through a 100/Mbps fast Ethernet switch according to an embodiment.

The setup for the next performance test configuration hosted the controller application in one laptop and hosted the I/O system in another identical laptop. The communication between the controller and the I/O system was implemented through a 16-port 10/100 Mbps 3Com fast Ethernet switch using real-time publish/subscribe DDS middleware. FIG. 14 is a graph of the average communication latency through a 100/Mbps fast Ethernet switch. The measured average throughput bandwidth between one controller and one I/O system through fast Ethernet switch measured in packets per second is represented by the diamond series. FIG. 15 is a graph of the measured average throughput through a fast Ethernet switch in Megabits per second, represented by the square series.

With reference back to FIG. 14, the communication latency is consistently about 2 ms with packet size up to 800 bytes. It started to increase significantly when the packet size increased beyond 800 bytes, and reached 26 ms with a packet size of 12,800 bytes. The reason for this increase in communication latency is exemplified by the throughput graph where the middleware starts consuming the maximum bandwidth of the Ethernet communication switch of 100 Mbps with packet size of 1,600 bytes. Since the quality of service is set to reliable communication, the middleware started blocking the packets and throttled the communication with maximum bandwidth available close to 100 Mbps. This demonstrates that the throughput is limited by the network capability and not by the CPU or real-time DDS middleware. Although the communication latency was very high with packet size of 12,800 bytes compared to a packet size of 800 bytes, it was still within the required scan time resolution of 35 ms.

Figure 16:
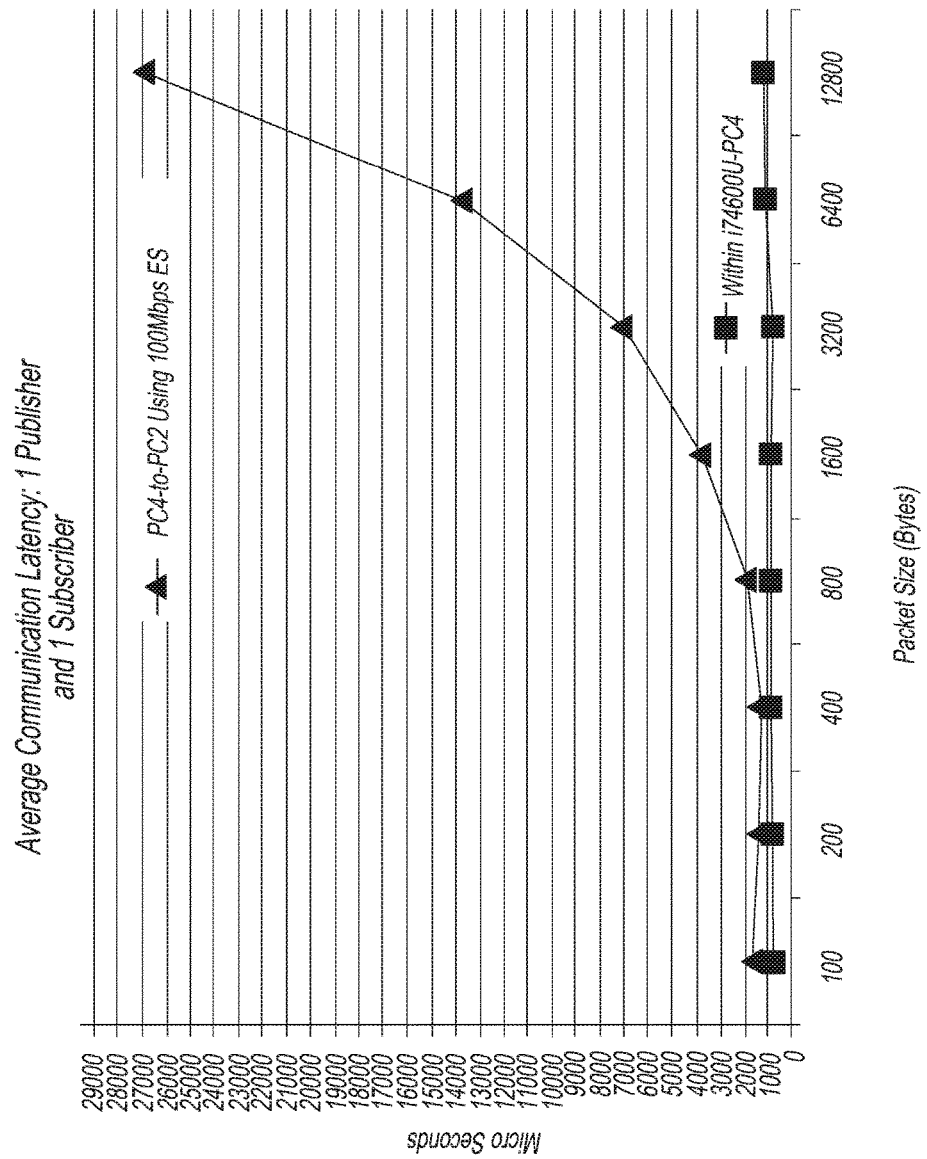
FIG. 16 is a graph of the average communication latency performance according to an embodiment.

FIG. 16 is a graph of the average communication latency for one publisher and one subscriber for an I/O system and control application within each laptop and across 100 Mbps Ethernet switch. There was no significant impact in terms of communication latency due to the middleware communication overhead within each laptop. Also, there was a minimum impact due to the Ethernet communication overhead on the performance when the packet size was within 800 bytes. However, with a larger packet size beyond 800 bytes, the negative performance impact in communication latency was proportional to the transmission time of the packet through the Ethernet switch. The communication latency within 27 ms was adequate for most process automation applications. However, when there is a special need for higher resolution scan time requiring less than 27 ms latency, a higher bandwidth communication network is recommended. The higher the communication bandwidth, the lower the communication latency that can approach 1 ms, as was demonstrated for the case when both publisher and subscriber applications were within the same computing machine.

Figure 17:
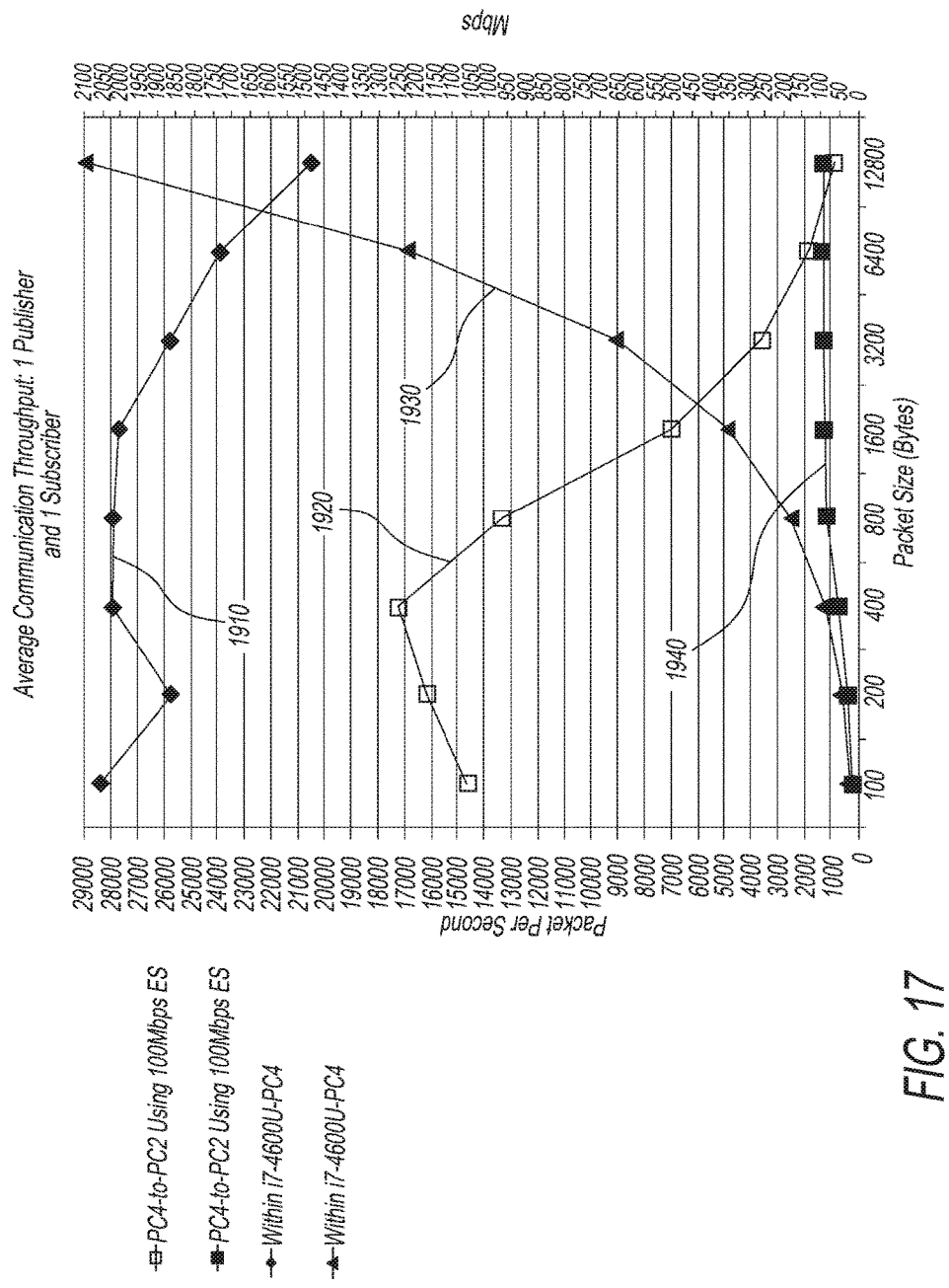
FIG. 17 is a graph of the average communication throughput performance according to an embodiment.

FIG. 17 is a graph of the average communication throughput for one publisher and one subscriber for an I/O system and control application within each laptop and across 100 Mbps Ethernet switch. Curves 1910 and 1920 represent the throughput in terms of packets per second, and the curves 1930 and 1940 represent the throughput in terms of Megabits per second.

The optimum throughput of 28,000 packets per second was achieved when the packet size equaled 400 bytes when both publisher and subscriber applications were within the same computing machine. The communication throughput drops down to 20,000 packets per second when using a packet size of 12,800 bytes. However, it was about 18% higher than the optimum result achieved when the communication was crossing the 100 Mbps Ethernet switch. Also, the decline slope for the communication throughput, when the packet size was more than 400 bytes, was sharper when the communication between the publisher and subscriber applications was performed through the Ethernet switch. The communication throughput in terms of Megabits per second was calculated by multiplying the throughput rate in terms of packets per second times the size of the packet in bits. The middleware throttled the transmitted packets through the available fast Ethernet communication bandwidth of 100 Mbps.

For achieving optimum collaboration among process control applications, the publisher, i.e. the I/O system in this case, needs to reliably provide the right information at the right time to multiple subscribers, which are the associated control applications. Most of the subscribers require the process data information within seconds. The discrete and regulatory control applications need the process data information within 100 ms. To address the worst case scenario, the middleware performance was evaluated among the publisher and subscribers in terms of communication latency to be within 100 ms. Each test scenario was repeated eight times with different data packet sizes of 100, 200, 400, 800, 1600, 3200, 6400, and 12,800 bytes. The change in data size represents the change in the number of I/O signals. The subscribers measured the throughput by counting the number of received data packets per second and the throughput rate of Megabits per second. The throughput was identical for all subscribers since the real-time middleware was designed with reliable communication quality of service. Therefore, the total throughput was the aggregate throughput of all subscribers. The performance test measured the actual communication latency and throughput of multiple control applications and one I/O system scenarios.

Figure 18:
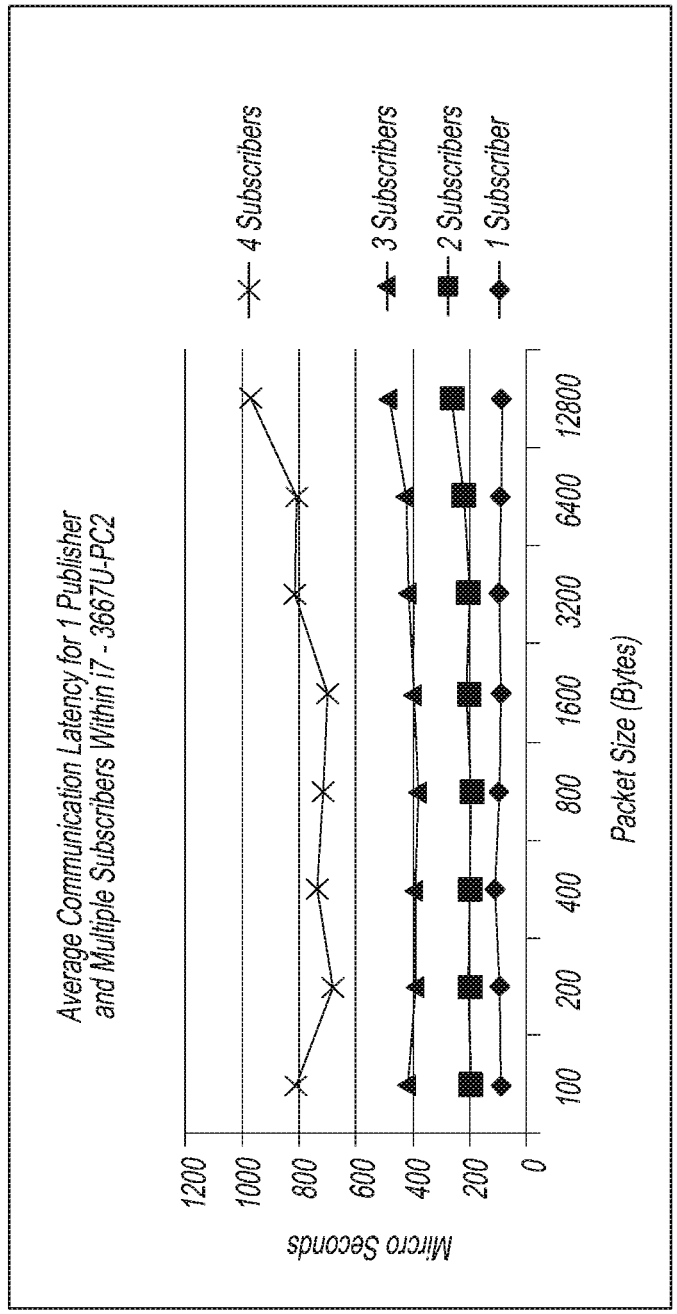
FIG. 18 is a graph of the average communication latency performance according to an embodiment.

The setup for the next performance test configuration hosted one I/O system and multiple control applications and up to four subscribers in one laptop. The measured average communication latency for four unicast communication scenarios with one, two, three, and four subscribers is illustrated in the graph of FIG. 18. The performance result of the average communication latency between the multiple control applications and the I/O system while varying the controller size from 100 bytes to a controller size of 12,800 bytes was within 1 ms, which is well below the required scan time resolution. The data also shows that communication latency remained consistently low as message size increased for the four scenarios. The communication latency was doubled by increasing the number of subscribers by one. Stated another way, the communication latency was in the range of 100 micro seconds for one subscriber, 200 micro seconds for two subscribers, 400 micro seconds for three subscribers, and in the range of 800 micro seconds for four subscribers.

Figure 19:
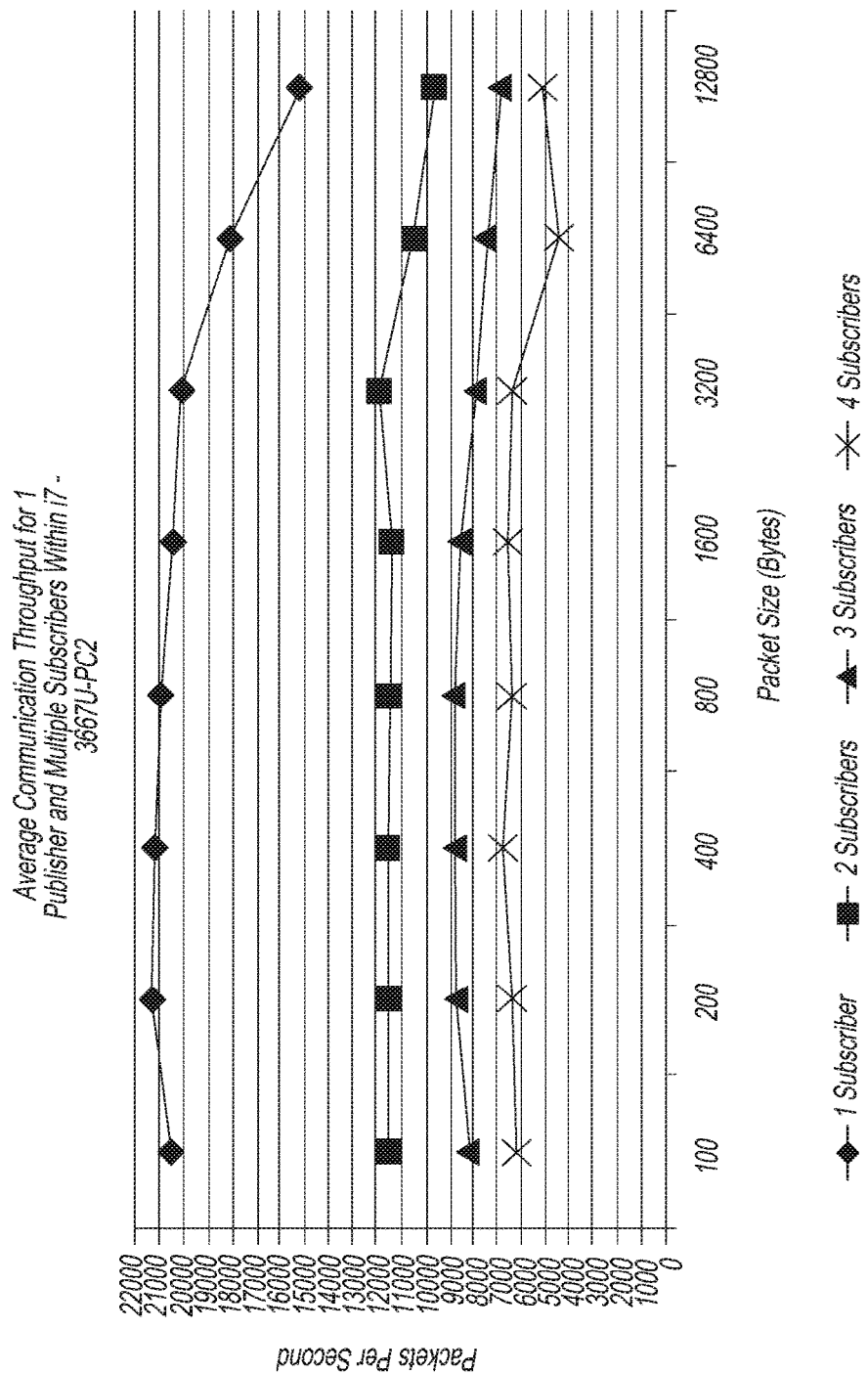
FIG. 19 is a graph of the average communication throughput performance per subscriber according to an embodiment.
Figure 20:
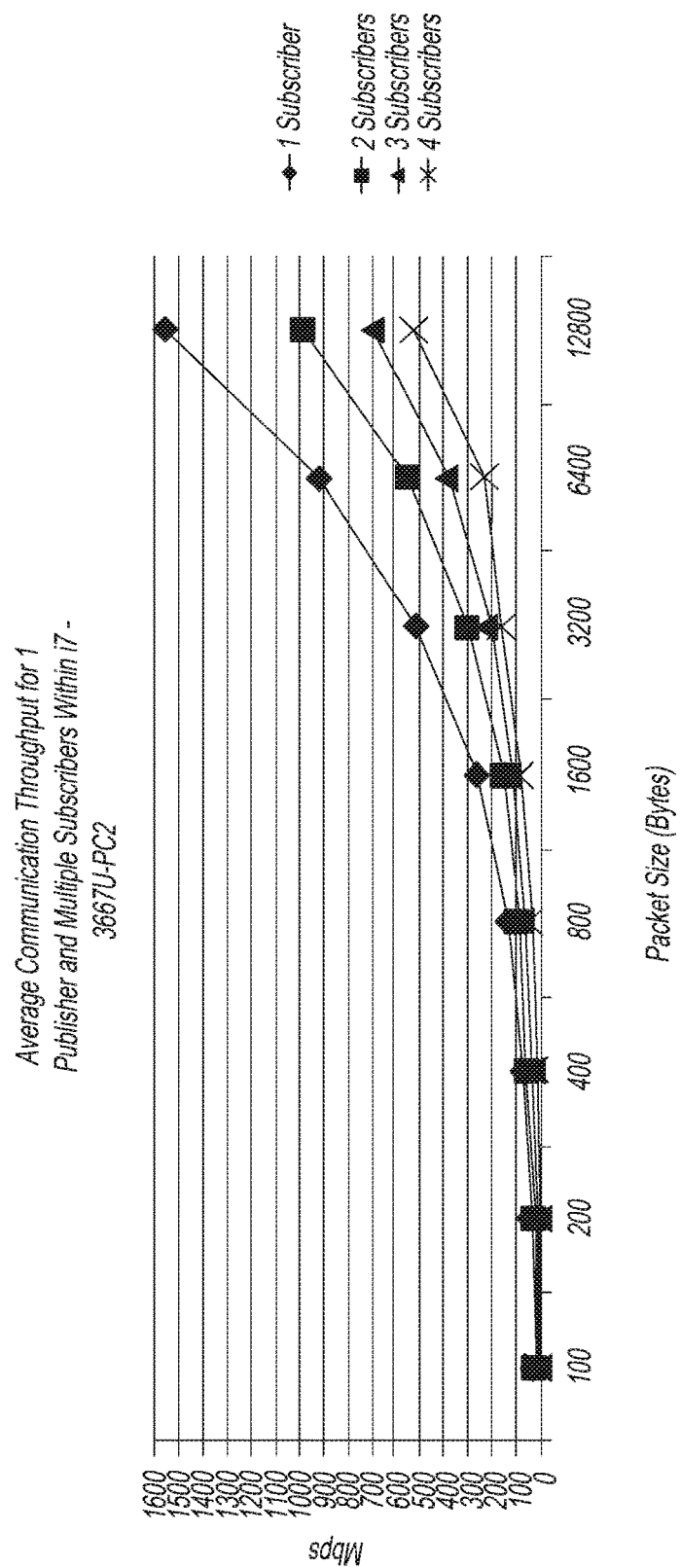
FIG. 20 is a graph of the average communication throughput performance per subscriber according to an embodiment.

The measured average throughput bandwidth per subscriber between multiple control applications and one I/O system for the fourth laptop measured in packets per second and Megabits per second is illustrated in the graphs of FIG. 19 and FIG. 20, respectively. The graphs show sustainable publish/subscribe throughput bandwidth. The slight decrease in the throughput in terms of number of packets per second is due to the increase in transmission time of each packet. However, the throughput bandwidth in terms of Megabits per second increased significantly with the increase in packet size. This indicates the real-time DDS middleware was able to cope with the large increase in data loading, and fully utilized available data bus communication bandwidth between the control applications and the I/O system. Stated another way, it did not impose any inherent limit on the aggregate data messaging capacity, making it suitable for scalable collaborative automation platforms.

The highest system throughput recorded in this experiment was 26,828 packets per second, for the scenario with one publisher and four subscribers using a 400-byte packet size. The lowest system throughput recorded in this experiment was 15,128 packets per second, for the scenario with one publisher and one subscriber using a 12,800-byte packet size. The highest system throughput bandwidth recorded in this experiment was 2095 Mbps, for the scenario with one publisher and three subscribers using a 12,800-byte packet size. The lowest system throughput bandwidth recorded in this experiment was 16.4 Mbps, for the scenario with one publisher and one subscriber using a 100-byte packet size.

Figure 21:
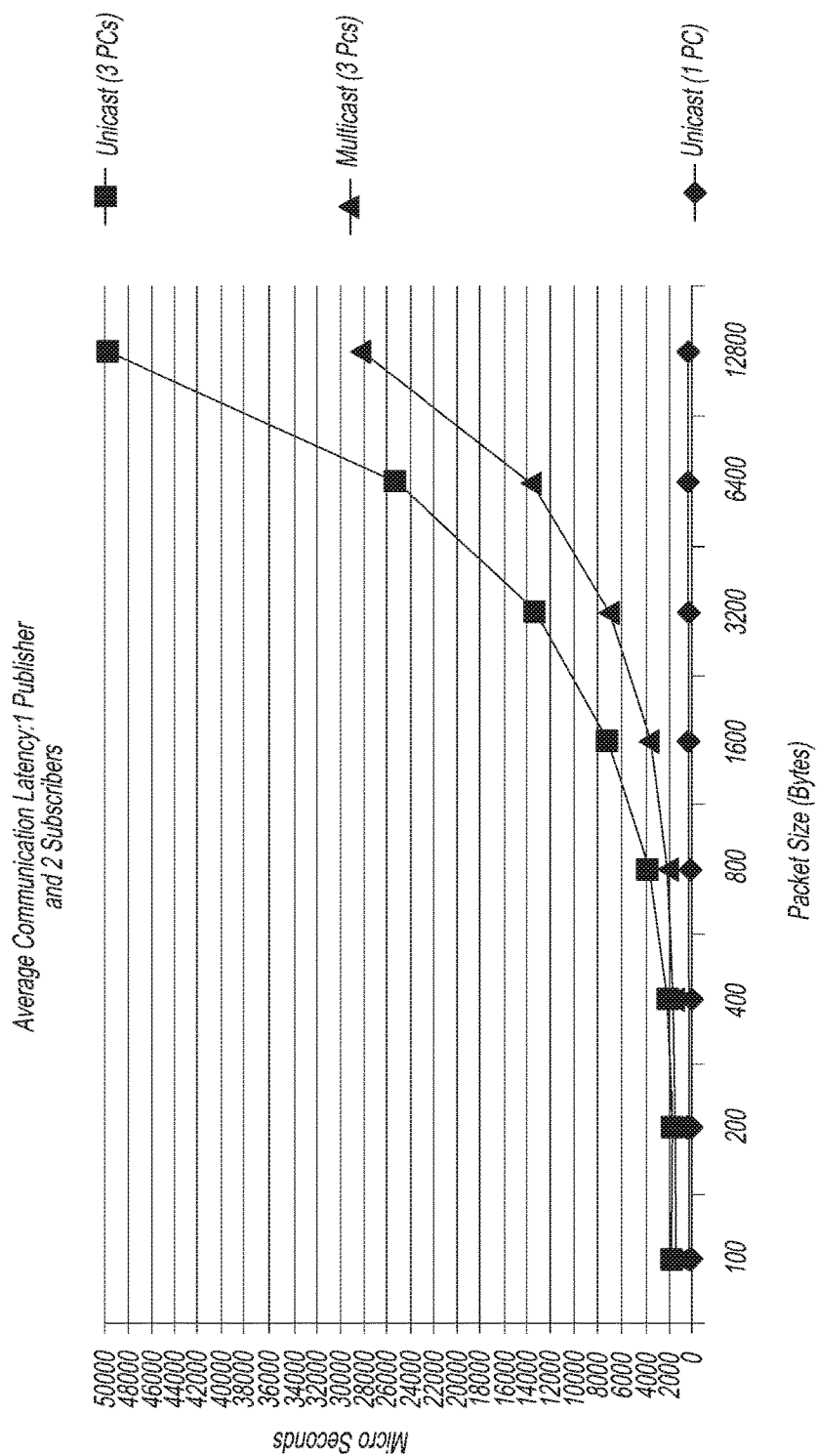
FIG. 21 is a graph of the average communication latency performance according to an embodiment.

The setup for the next performance test configuration hosted one I/O system in one laptop and two control applications In two additional laptops. The communication among the control applications and the I/O system was implemented through a 16-port 10/100 Mbps 3Com fast Ethernet switch using real-time publish/subscribe DDS middleware. The measured average communication latency hosting the publisher and two subscribers within one laptop and using unicast and multicast scenarios compared to the baseline case is illustrated in the graph of FIG. 21. The performance results of the average communication latency while varying the controller size from 100 bytes to a controller size of 400 bytes between two control applications and the I/O system for the three cases were within 2 ms, which is well below the required scan time resolution. As the packet size increased beyond 400 bytes, the average communication latency increased significantly using unicast communication with a packet size of 12,800 bytes up to 50 ms. There was a moderate proportional increase in the average communication latency using multicast communication with a packet size of 12,800 bytes up to 28 ms. Therefore, multicast communication mode appears to be the best method for communicating between a publisher and multiple subscribers in a collaborative automation platform.

Figure 22:
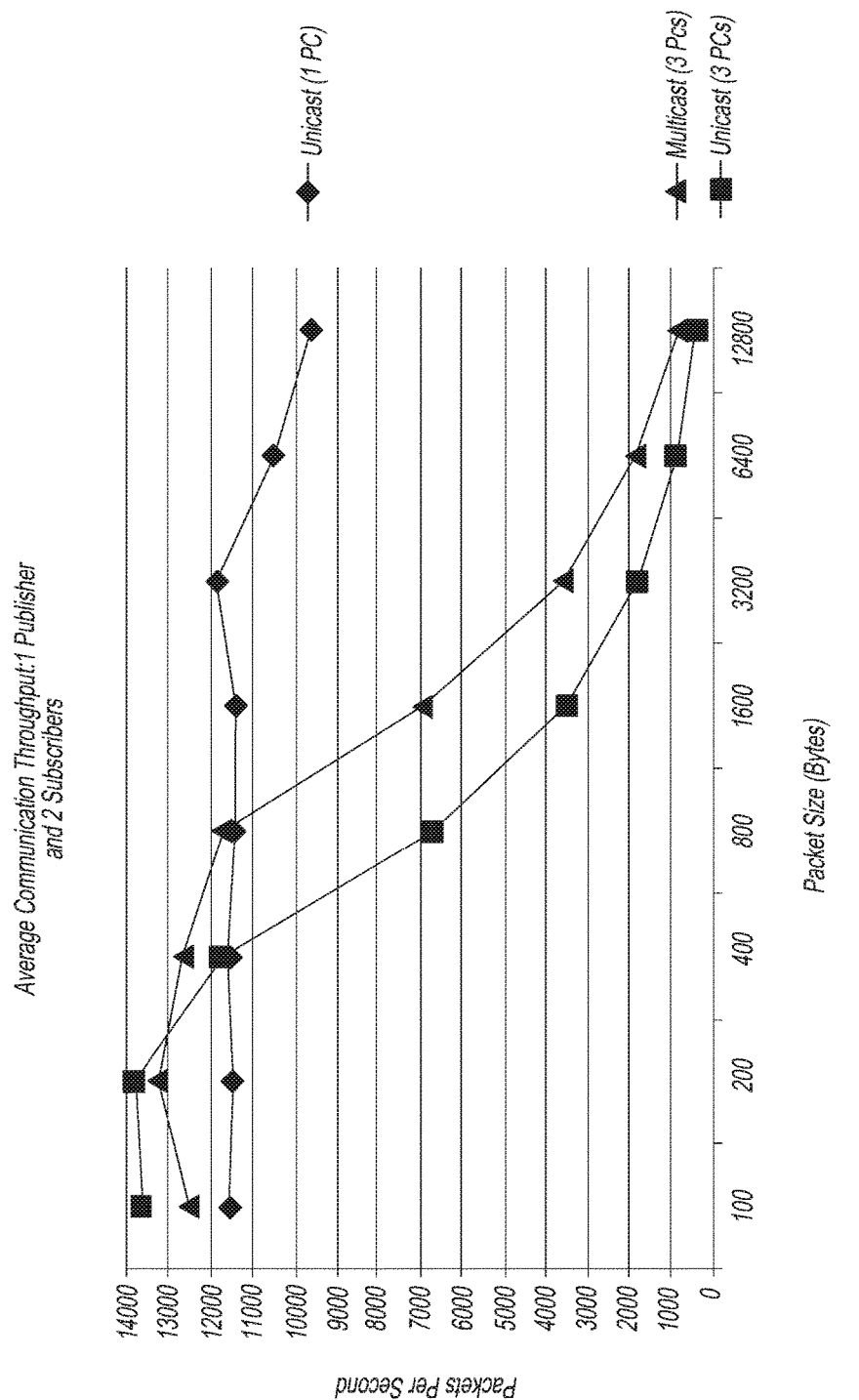
FIG. 22 is a graph of the average communication throughput performance per subscriber according to an embodiment.
Figure 23:
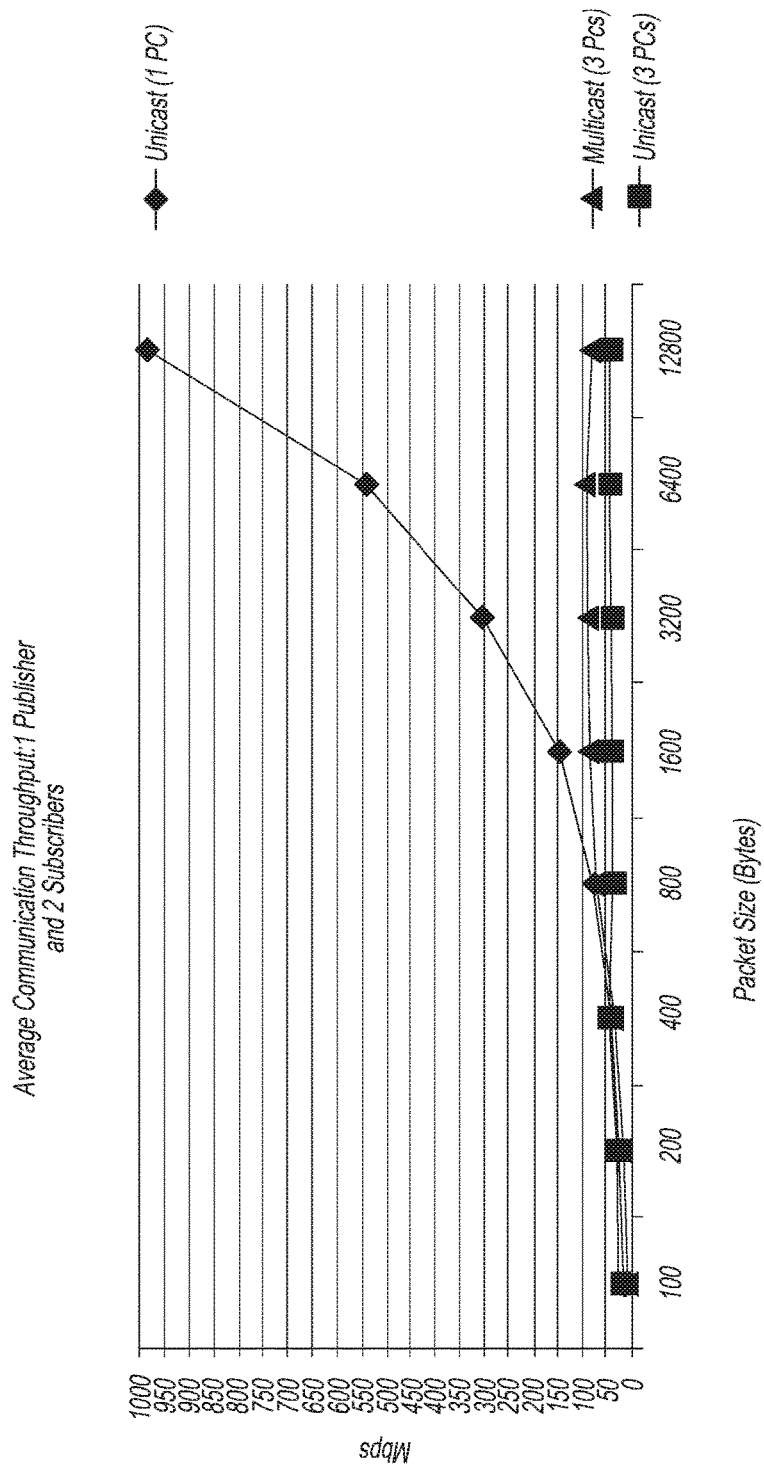
FIG. 23 is a graph of the average communication throughput performance per subscriber according to an embodiment.

The measured average communication throughput per subscriber hosting the publisher and two subscribers within one laptop and using unicast and multicast scenarios compared to the baseline case are illustrated in the graphs of FIG. 22 and FIG. 23, respectively. Sustainable publish/subscribe throughput bandwidth between both control applications and the I/O system while varying the controller size from 100 bytes to a controller size of 400 bytes for the three cases in terms of packets per second is illustrated in FIG. 22. There is a significant drop in the throughput per subscriber in terms of the number of packets per second while increasing the size of the controller beyond 800 bytes, due to the increase in transmission time of each packet and the requirement to throttle the communication with the maximum bandwidth available close to 100 Mbps.

The multicast communication scenario shows a better performance compared to the unicast communication in terms of packets per second in FIG. 22. The multicast communication is more suitable for the real-time DDS middleware to cope with the large increase in data loading, and it fully utilized available network communication bandwidth between the control applications and the I/O system. Stated another way, it did not impose any inherent limit on the aggregate data messaging capacity, which makes it suitable for scalable collaborative automation platforms. It is recommended to use higher network bandwidth capacity, such as the 1 Gbps Ethernet switch to sustain the throughput for a large collaborative automation platform beyond 400-byte packet size. This should restore the communication throughput performance close to the baseline case, as illustrated in FIG. 23 where the baseline throughput is less than 1 Gbps for the largest controller using a packet size of 12,800 bytes.

Figure 24:
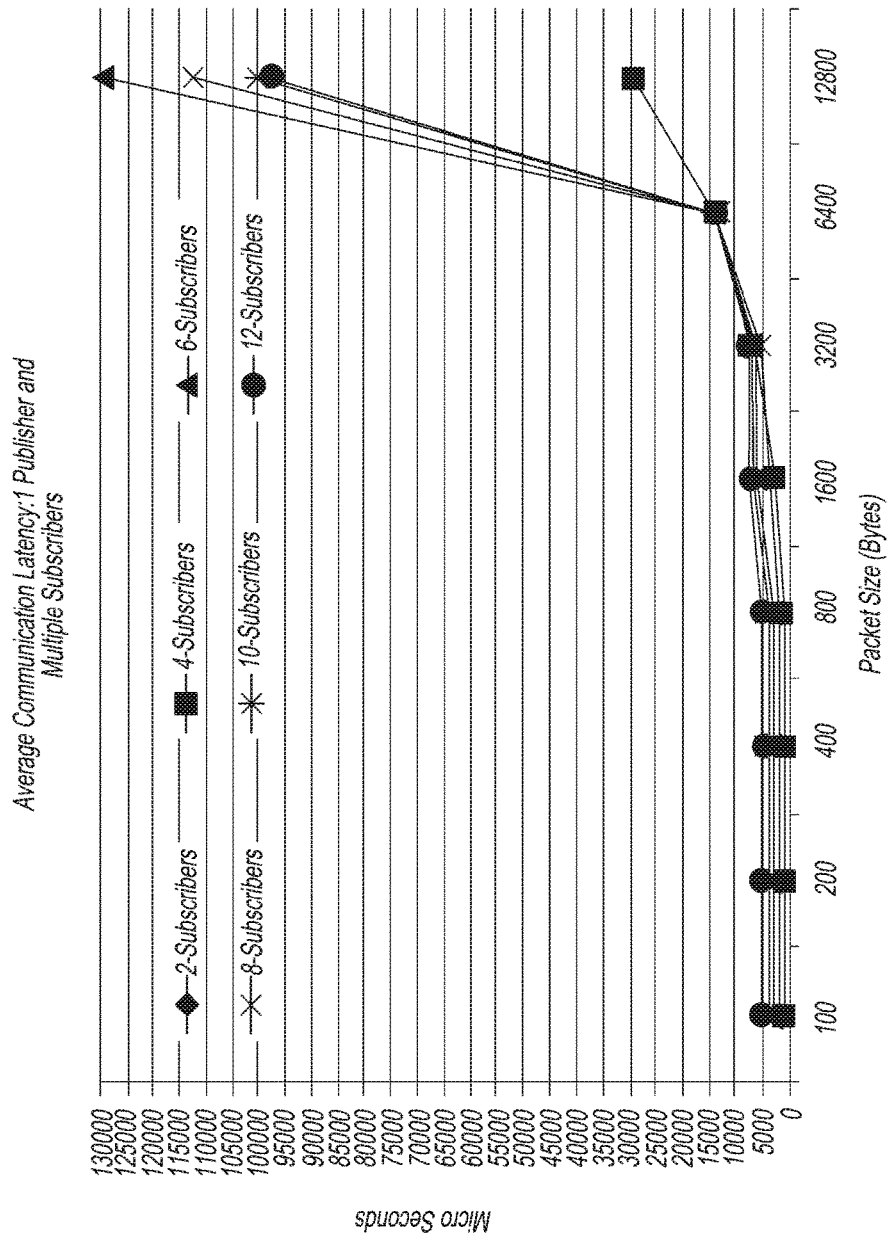
FIG. 24 is a graph of the average communication latency performance according to an embodiment.

The setup for the next performance test configuration hosted one I/O system in one laptop and multiple control applications evenly distributed in two additional laptops. The communication among the control applications and the I/O system was implemented through a 16-port 10/100 Mbps 3Com fast Ethernet switch using real-time publish/subscribe DDS middleware. The measured average communication latency using multicast communication scenarios is illustrated in the graph of FIG. 24. The scenarios included two subscribers, four subscribers, six subscribers, eight subscribers, ten subscribers, and twelve subscribers corresponding to the collaborative applications illustrated in FIG. 6.

The performance result of the average communication latency between multiple control applications and the I/O system while varying the controller size from 100 bytes to a controller size of 6400 bytes for the six cases is within 15 ms, which is well below the required scan time resolution. As the packet size increased beyond 6400 bytes, the average communication latency increased significantly for the cases of six, eight, ten, and twelve subscribers with a packet size of 12,800 bytes up to 128 ms. This is due to the bandwidth limitation within the 100 Mbps Ethernet switch. For the cases of two and four subscribers, the average communication latency was within 30 ms, which met the required scan time resolution. To reduce communication latency for more than four control applications below 35 ms, the control network should upgrade to a 1 Gbps Ethernet infrastructure.

Figure 25:
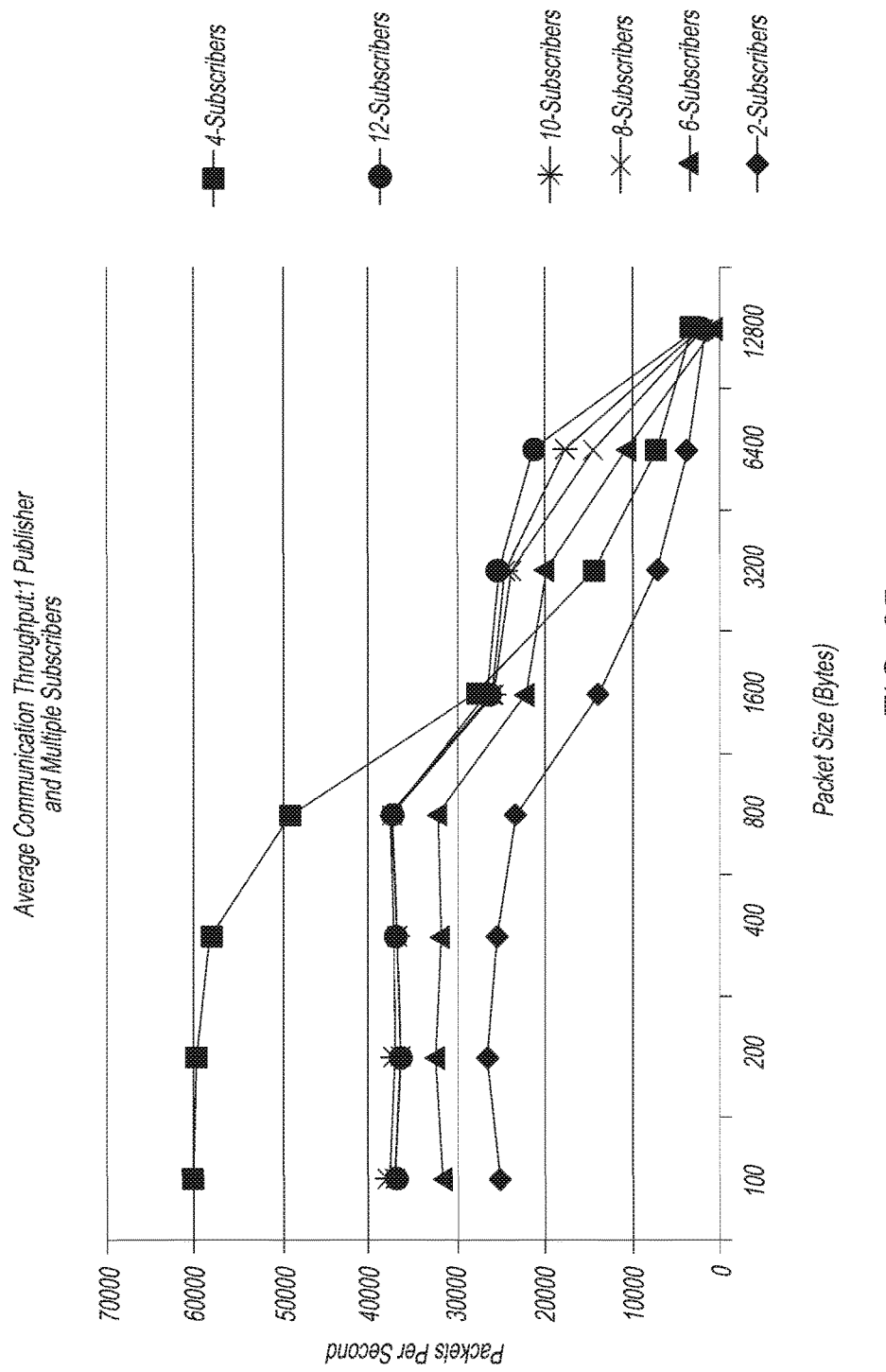
FIG. 25 is a graph of the average communication throughput performance in packets/second according to an embodiment.

The measured average communication throughput in packets per second is illustrated in the graph of FIG. 25 for the six scenarios of two, four, six, eight, ten, and twelve subscribers. The graphs show sustainable publish/subscribe throughput bandwidth between the control applications and the I/O system for the six cases in terms of packets per second, while varying the controller size from 100 bytes to a controller size of 800 bytes. There is a significant drop in the throughput per subscriber in terms of number of packets per second while increasing the size of the controller beyond 800 bytes, due to the increase in transmission time of each packet and the requirement to throttle the communication with maximum bandwidth available close to 100 Mbps.

Figure 26:
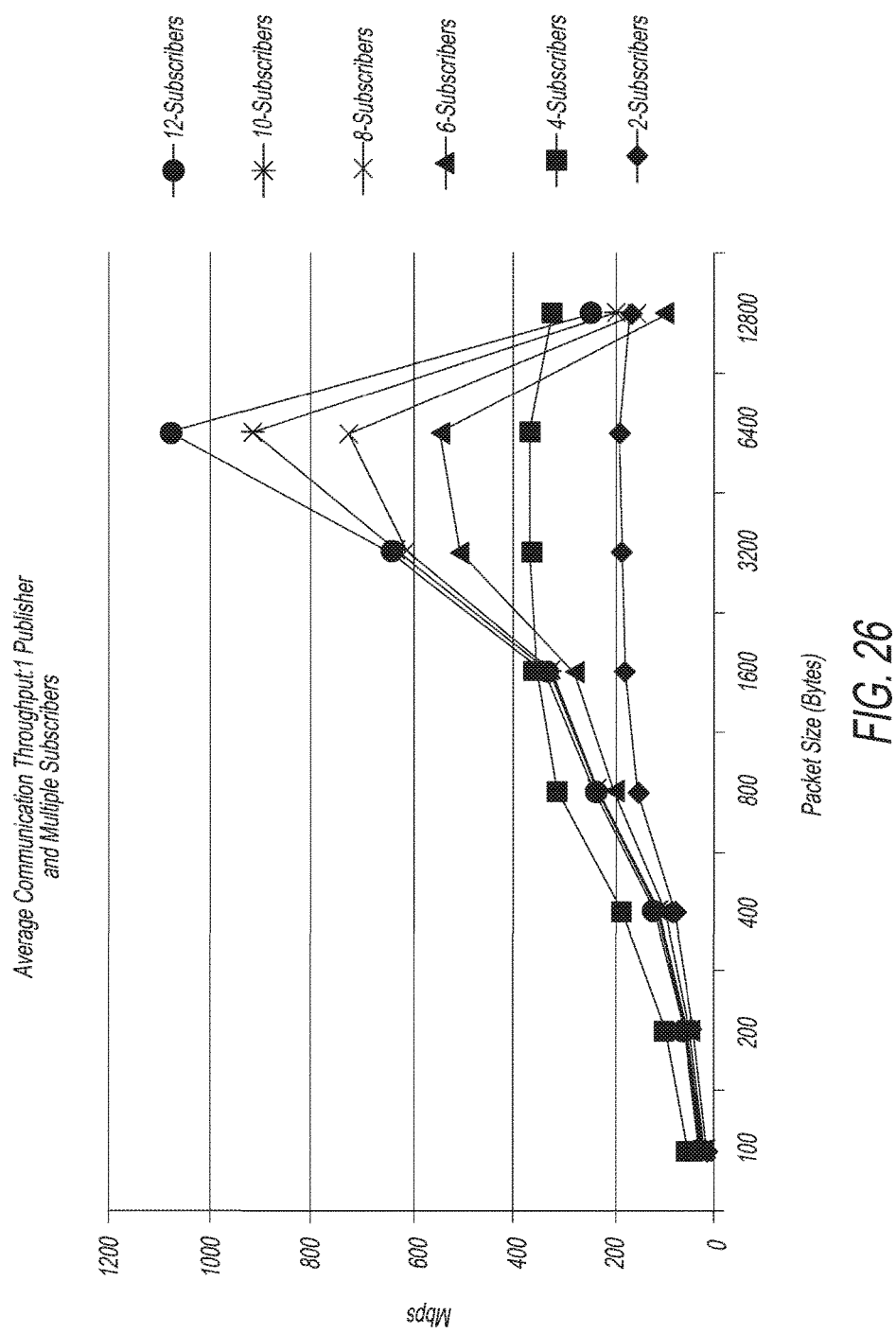
FIG. 26 is a graph of the average communication throughput performance in Mbps according to an embodiment.

FIG. 26 is a graph of the measured average communication throughput in Megabits per second for the six scenarios of two, four, six, eight, ten, and twelve subscribers. The communication throughput increases proportionally to the size of the packet, until it reaches the maximum bandwidth available in the Ethernet switch. Each communication link is limited by 100 Mbps. For two subscribers, the communication throughput ramps up until it approaches 200 Mbps with a packet size of 6400 bytes and starts to drop down after that. Similarly, for twelve subscribers, the communication throughput ramps up until it approaches 1200 Mbps with a packet size of 6400 bytes and starts to drop down after that.

Limitations exist in current client-server communication models deployed in refining and petrochemical industries, which include integrating highly interacting process control applications across multiple network layers utilized in distributed control systems. In embodiments described herein, collaborative automation platforms achieve an optimum process control environment and optimum operation of processing equipment to achieve a maximum yield of manufacturing facilities. This is achieved by employing real-time reliable and fault-tolerant data-centric middleware to provide a seamless cross-vendor interoperability. Detailed performance analysis was conducted to evaluate the viability of utilizing the real-time publish/subscribe DDS middleware as a core communication link between the I/O systems and the control applications, including sequential and regulatory control, advanced regulatory control, multivariable control, unit-based process control, and plant-wide advanced process control.

The performance result of the average communication latency between the controller and the I/O system in all tests was well below the required scan time resolution when the controller size was varied from 100 bytes, equivalent to a controller with 400 digital I/O and 50 analog I/O, to a controller size of 12,800 bytes, equivalent to a controller with 80,000 digital I/O and 2,800 analog I/O. Since the real-time publish/subscribe DDS middleware uses true peer-to-peer messaging with no centralized or message broker, server or daemon processes, the performance tests showed that it does not impose any inherent limit on the aggregate messaging capacity, which makes it suitable for scalable collaborative automation platforms.

Several advantages of the collaborative automation platform are achieved. It is a cost effective evergreen solution because it is based on interoperable and standard COTS software and hardware components, resulting in optimum capital investment for the total cost of ownership throughout its life span. It is based on a distributed architecture where I/O modules, CPU, and control applications are not interwoven. Changing I/O voltage signals does not have any impact on the control application. It reduces initial capital investment for grass root projects since it does not require any PIBs, as well as the system and marshaling cabinets, or the associated cable wiring to the junction boxes.

Figure 27:
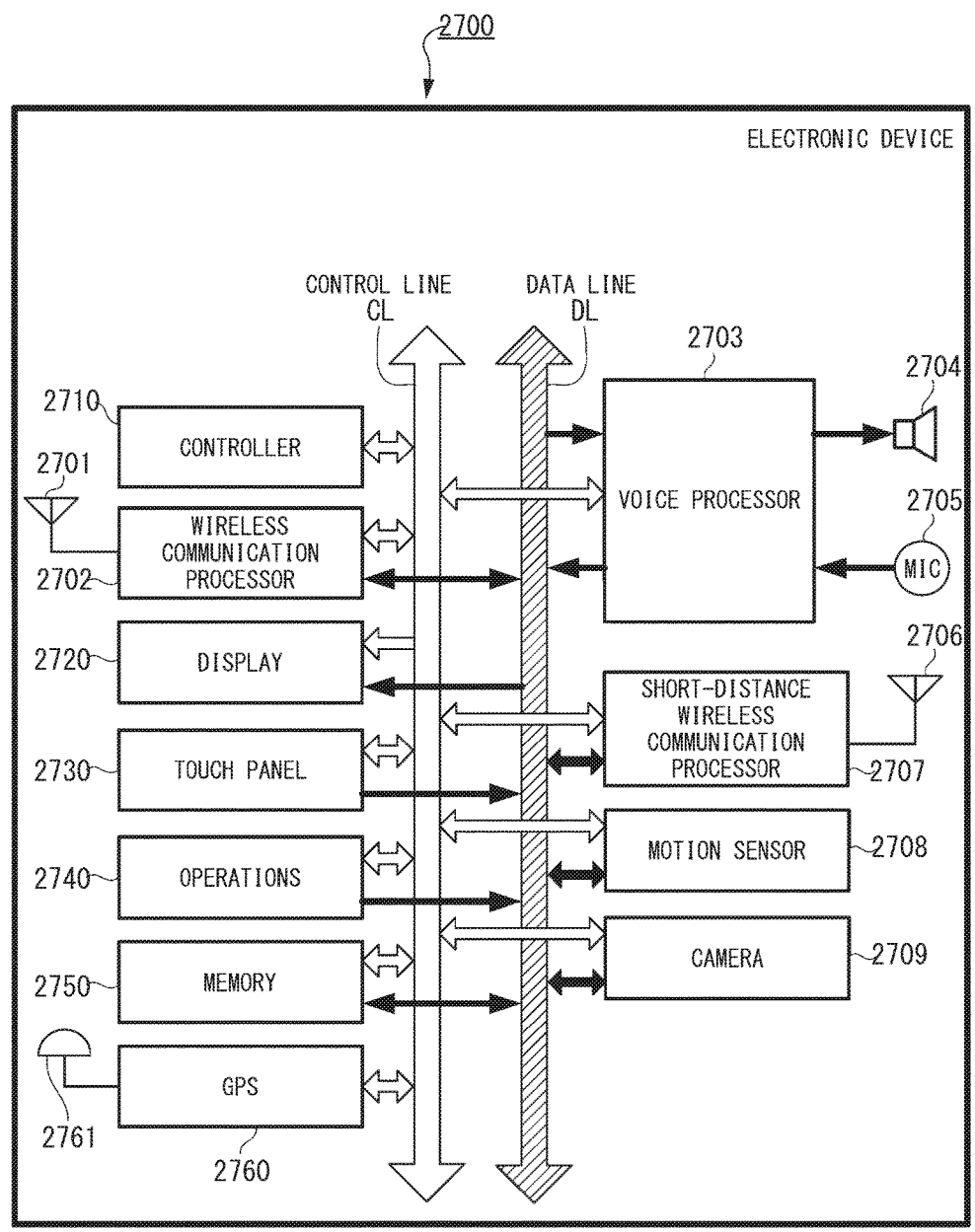
FIG. 27 is a block diagram illustrating an exemplary electronic device according to an embodiment.

FIG. 27 is a block diagram illustrating an exemplary electronic device used in accordance with embodiments of the present disclosure. In the embodiments, electronic device 2700 can be a smartphone, a laptop, a tablet, a server, an e-reader, a camera, a navigation device, etc. Electronic device 2700 could be used as one or more of the devices used in association with the HMIs 785 of FIG. 6. The exemplary electronic device 2700 of FIG. 27 includes a controller 2710 and a wireless communication processor 2702 connected to an antenna 2701. A speaker 2704 and a microphone 2705 are connected to a voice processor 2703.

The controller 2710 can include one or more Central Processing Units (CPUs), and can control each element in the electronic device 2700 to perform functions related to communication control, audio signal processing, control for the audio signal processing, and moving image processing and control, and other kinds of signal processing. The controller 2710 can perform these functions by executing instructions stored in a memory 2750. Alternatively or in addition to the local storage of the memory 2750, the functions can be executed using instructions stored on an external device accessed on a network or on a non-transitory computer readable medium.

The memory 2750 includes but is not ted to Read Only Memory (ROM), Random Access Memory (RAM), or a memory array including a combination of volatile and non-volatile memory units. The memory 2750 can be utilized as working memory by the controller 2710 while executing the processes and algorithms of the present disclosure. Additionally, the memory 2750 can be used for long-term storage, e.g., of image data and information related thereto.

The electronic device 2700 includes a control line CL and data line DL as internal communication bus lines. Control data to/from the controller 2710 can be transmitted through the control line CL. The data line DL can be used for transmission of voice data, display data, etc.

The antenna 2701 transmits/receives electromagnetic wave signals between base stations for performing radio-based communication, such as the various forms of cellular telephone communication. The wireless communication processor 2702 controls the communication performed between the electronic device 2700 and other external devices via the antenna 2701. For example, the wireless communication processor 2702 can control communication between base stations for cellular phone communication.

The speaker 2704 emits an audio signal corresponding to audio data supplied from the voice processor 2703. The microphone 905 detects surrounding audio and converts the detected audio into an audio signal. The audio signal can then be output to the voice processor 2703 for further processing. The voice processor 2703 demodulates and/or decodes the audio data read from the memory 2750 or audio data received by the wireless communication processor 2702 and/or a short-distance wireless communication processor 2707. Additionally, the voice processor 2703 can decode audio signals obtained by the microphone 2705.

The exemplary electronic device 2700 can also include a display 2720, a touch panel 2730, an operations key 2740, and a short-distance communication processor 2707 connected to an antenna 2706. The display 2720 can be a Liquid Crystal Display (LCD), an organic electroluminescence display panel, or another display screen technology. In addition to displaying still and moving image data, the display 2720 can display operational inputs, such as numbers or icons which can be used for control of the electronic device 2700. The display 2720 can additionally display a GUI for a user to control aspects of the electronic device 2700 and/or other devices. Further, the display 2720 can display characters and images received by the electronic device 2700 and/or stored in the memory 2750 or accessed from an external device on a network. For example, the electronic device 2700 can access a network such as the Internet and display text and/or images transmitted from a Web server.

The touch panel 2730 can include a physical touch panel display screen and a touch panel driver. The touch panel 2730 can include one or more touch sensors for detecting an input operation on an operation surface of the touch panel display screen. The touch panel 2730 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus can include a conductive material at least at the tip of the stylus such that the sensors included in the touch panel 930 can detect when the stylus approaches/contacts the operation surface of the touch panel display (similar to the case in which a finger is used for the touch operation).

According to aspects of the present disclosure, the touch panel 2730 can be disposed adjacent to the display 2720 (e.g., laminated) or can be formed integrally with the display 2720. For simplicity, the present disclosure assumes the touch panel 2730 is formed integrally with the display 2720 and therefore, examples discussed herein can describe touch operations being performed on the surface of the display 2720 rather than the touch panel 2730. However, the skilled artisan will appreciate that this is not limiting.

For simplicity, the present disclosure assumes the touch panel 2730 is a capacitance-type touch panel technology. However, it should be appreciated that aspects of the present disclosure can easily be applied to other touch panel types (e.g., resistance-type touch panels) with alternate structures. According to aspects of the present disclosure, the touch panel 930 can include transparent electrode touch sensors arranged in the X-Y direction on the surface of transparent sensor glass.

The touch panel driver can be included in the touch panel 2730 for control processing related to the touch panel 2730, such as scanning control. For example, the touch panel driver can scan each sensor in an electrostatic capacitance transparent electrode pattern in the X-direction and Y-direction and detect the electrostatic capacitance value of each sensor to determine when a touch operation is performed. The touch panel driver can output a coordinate and corresponding electrostatic capacitance value for each sensor. The touch panel driver can also output a sensor identifier that can be mapped to a coordinate on the touch panel display screen. Additionally, the touch panel driver and touch panel sensors can detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. Signals can be transmitted by the touch panel driver, e.g. in response to a detection of a touch operation, in response to a query from another element based on timed data exchange, etc.

The touch panel 2730 and the display 2720 can be surrounded by a protective casing, which can also enclose the other elements included in the electronic device 2700. According to aspects of the disclosure, a position of the user's fingers on the protective casing (but not directly on the surface of the display 2720) can be detected by the touch panel 2730 sensors. Accordingly, the controller 2710 can perform display control processing described herein based on the detected position of the user's fingers gripping the casing. For example, an element in an interface can be moved to a new location within the interface (e.g., closer to one or more of the fingers) based on the detected finger position.

Further, according to aspects of the disclosure, the controller 2710 can be configured to detect which hand is holding the electronic device 2700, based on the detected finger position. For example, the touch panel 2730 sensors can detect a plurality of fingers on the left side of the electronic device 2700 (e.g., on an edge of the display 2720 or on the protective casing), and detect a single finger on the right side of the electronic device 2700. In this exemplary scenario, the controller 2710 can determine that the user is holding the electronic device 2700 with his/her right hand because the detected grip pattern corresponds to an expected pattern when the electronic device 2700 is held only with the right hand.

The operation key 2740 can include one or more buttons or similar external control elements, which can generate an operation signal based on a detected input by the user. In addition to outputs from the touch panel 930, these operation signals can be supplied to the controller 2710 for performing related processing and control. According to aspects of the disclosure, the processing and/or functions associated with external buttons and the like can be performed by the controller 2710 in response to an input operation on the touch panel 2730 display screen rather than the external button, key, etc. In this way, external buttons on the electronic device 2700 can be eliminated in lieu of performing inputs via touch operations, thereby improving water-tightness.

The antenna 2706 can transmit/receive electromagnetic wave signals to/from other external apparatuses, and the short-distance wireless communication processor 2707 can control the wireless communication performed between the other external apparatuses. Bluetooth, IEEE 802.11, and near-field communication (NFC) are non-limiting examples of wireless communication protocols that can be used for inter-device communication via the short-distance wireless communication processor 2707.

The electronic device 2700 can include a motion sensor 2708. The motion sensor 2708 can detect features of motion (i.e., one or more movements) of the electronic device 2700. For example, the motion sensor 908 can include an accelerometer to detect acceleration, a gyroscope to detect angular velocity, a geomagnetic sensor to detect direction, a geo-location sensor to detect location, etc., or a combination thereof to detect motion of the electronic device 2700. According to aspects of the disclosure, the motion sensor 2708 can generate a detection signal that includes data representing the detected motion. For example, the motion sensor 2708 can determine a number of distinct movements in a motion (e.g., from start of the series of movements to the stop, within a predetermined time interval, etc.), a number of physical shocks on the electronic device 2700 (e.g., a jarring, hitting, etc., of the electronic device 2700), a speed and/or acceleration of the motion (instantaneous and/or temporal), or other motion features. The detected motion features can be included in the generated detection signal. The detection signal can be transmitted, e.g., to the controller 2710, whereby further processing can be performed based on data included in the detection signal. The motion sensor 908 can work in conjunction with a Global Positioning System (GPS) 2760. The GPS 2760 detects the present position of the electronic device 2700. The information of the present position detected by the GPS 2760 is transmitted to the controller 2710. An antenna 2761 is connected to the GPS 2760 for receiving and transmitting signals to and from a GPS satellite.

Electronic device 2700 can include a camera 2709, which includes a lens and shutter for capturing photographs of the surroundings around the electronic device 2700. In an embodiment, the camera 2709 captures surroundings of an opposite side of the electronic device 2700 from the user. The images of the captured photographs can be displayed on the display panel 2720. A memory saves the captured photographs. The memory can reside within the camera 2709 or it can be part of the memory 2750. The camera 2709 can be a separate feature attached to the electronic device 2700 or it can be a built-in camera feature.

Figure 28:
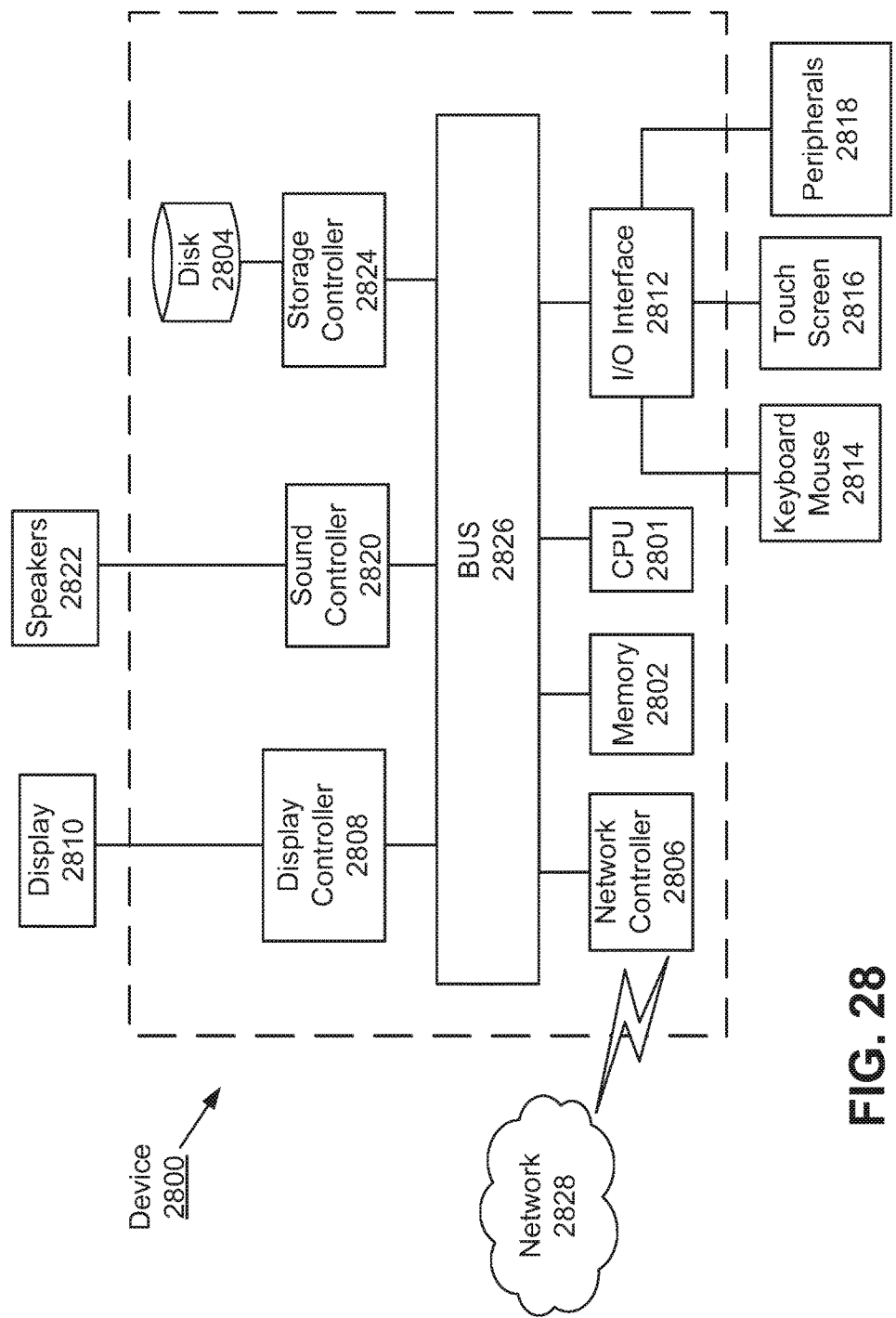
FIG. 28 is a block diagram illustrating a computing device according to an embodiment.

Next, a hardware description of an exemplary computing device 2800 used in accordance with some embodiments described herein is given with reference to FIG. 28. Features described above with reference to electronic device 2700 of FIG. 27 can be included in the computing device 2800 described below. Computing device 2800 could be used as one or more of the control servers 710, 790, 791, 792, or 793, the inferential modeling servers 720, or a device used in association with the HMIs 785 of FIG. 6.

In FIG. 28, the computing device 2800 includes a CPU 2801 which performs the processes described above and herein after. The process data and instructions can be stored in memory 2802. These processes and instructions can also be stored on a storage medium disk 2804 such as a hard drive (HDD) or portable storage medium or can be stored remotely. Further, the claimed features are not limited by the form of the computer-readable media on which the instructions of the process are stored. For example, the instructions can be stored on CDs, DVDs, in FLASH memory, RAM, ROM, PROM, EPROM, EEPROM, hard disk or any other information processing device with which the computing device 2800 communicates, such as a server or computer.

Further, the claimed features can be provided as a utility application, background daemon, or component of an operating system, or combination thereof, executing in conjunction with CPU 1001 and an operating system such as Microsoft Windows 7, UNIX, Solaris, LINUX, Apple MAC-OS and other systems known to those skilled in the art.

The hardware elements in order to achieve the computing device 2800 can be realized by various circuitry elements, known to those skilled in the art. For example, CPU 2801 can be a Xenon or Core processor from Intel of America or an Opteron processor from AMD of America, or can be other processor types that would be recognized by one of ordinary skill in the art. Alternatively, the CPU 2801 can be implemented on an FPGA, ASIC, PLD or using discrete logic circuits, as one of ordinary skill in the art would recognize. Further, CPU 2801 can be implemented as multiple processors cooperatively working in parallel to perform the instructions of the inventive processes described above and below.

The computing device 2800 in FIG. 28 also includes a network controller 2806, such as an Intel Ethernet PRO network interface card from Intel Corporation of America, for interfacing with network 2828. As can be appreciated, the network 2828 can be a public network, such as the Internet, or a private network such as an LAN or WAN network, or any combination thereof and can also include PSTN or ISDN sub-networks. The network 828 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device 2800 further includes a display controller 2808, such as a NVIDIA GeForce GTX or Quadro graphics adaptor from NVIDIA Corporation of America for interfacing with display 2810, such as a Hewlett Packard HPL2445w LCD monitor. A general purpose I/O interface 2812 interfaces with a keyboard and/or mouse 2814 as well as a touch screen panel 2816 on or separate from display 2810. Touch screen panel 2816 includes features described above with reference to touch panel 270 of FIG. 27. General purpose I/O interface 2812 also connects to a variety of peripherals 2818 including printers and scanners, such as an OfficeJet or DeskJet from Hewlett Packard.

A sound controller 2820 is also provided in the computing device 2800, such as Sound Blaster X-Fi Titanium from Creative, to interface with speakers/microphone 2822 thereby providing sounds and/or music.

The general purpose storage controller 2824 connects the storage medium disk 2804 with communication bus 2826, which can be an ISA, EISA, VESA, PCI, or similar, for interconnecting all of the components of the computing device 2800. A description of the general features and functionality of the display 2810, keyboard and/or mouse 2814, as well as the display controller 2808, storage controller 2824, network controller 2806, sound controller 2820, and general purpose I/O interface 2812 is omitted herein for brevity as these features are known.

The exemplary circuit elements described in the context of the present disclosure can be replaced with other elements and structured differently than the examples provided herein. Moreover, circuitry configured to perform features described herein can be implemented in multiple circuit units (e.g., chips), or the features can be combined in circuitry on a single chipset, as shown on FIG. 29. The chipset of FIG. 29 can be implemented in conjunction with either electronic device 2700 or computing device 2800 described above with reference to FIGS. 27 and 28, respectively.

Figure 29:
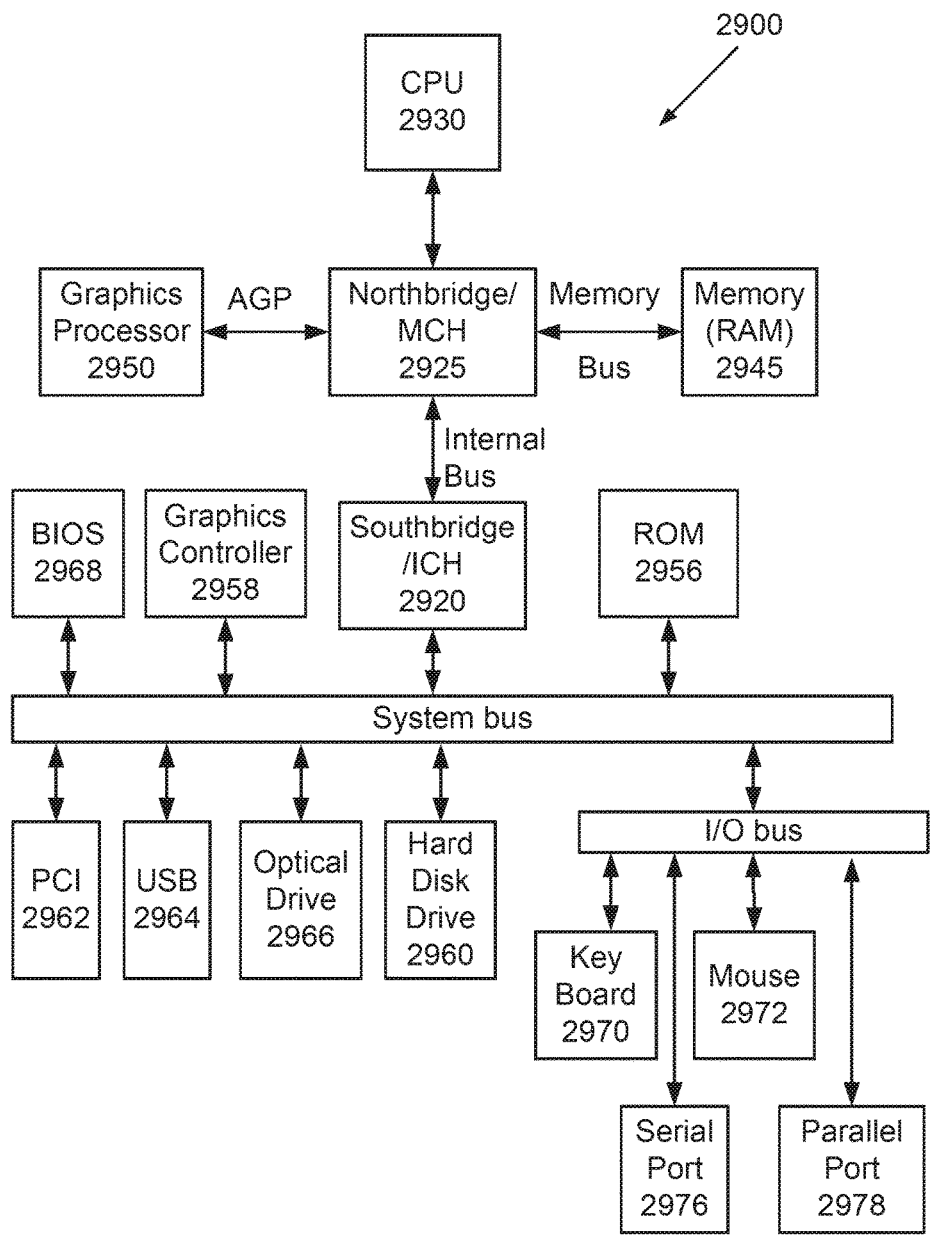
FIG. 29 is a block diagram illustrating an exemplary chipset according to an embodiment.

FIG. 29 shows a schematic diagram of a data processing system, according to aspects of the disclosure described herein for performing menu navigation, as described above. The data processing system is an example of a computer in which code or instructions implementing the processes of the illustrative embodiments can be located.

In FIG. 29, data processing system 2900 employs an application architecture including a north bridge and memory controller application (NB/MCH) 2925 and a south bridge and input/output (I/O) controller application (SB/ICH) 2920. The central processing unit (CPU) 2930 is connected to NB/MCH 2925. The NB/MCH 2925 also connects to the memory 2945 via a memory bus, and connects to the graphics processor 2950 via an accelerated graphics port (AGP). The NB/MCH 2925 also connects to the SB/ICH 2920 via an internal bus (e.g., a unified media interface or a direct media interface). The CPU 2930 can contain one or more processors and even can be implemented using one or more heterogeneous processor systems.

Figure 30:
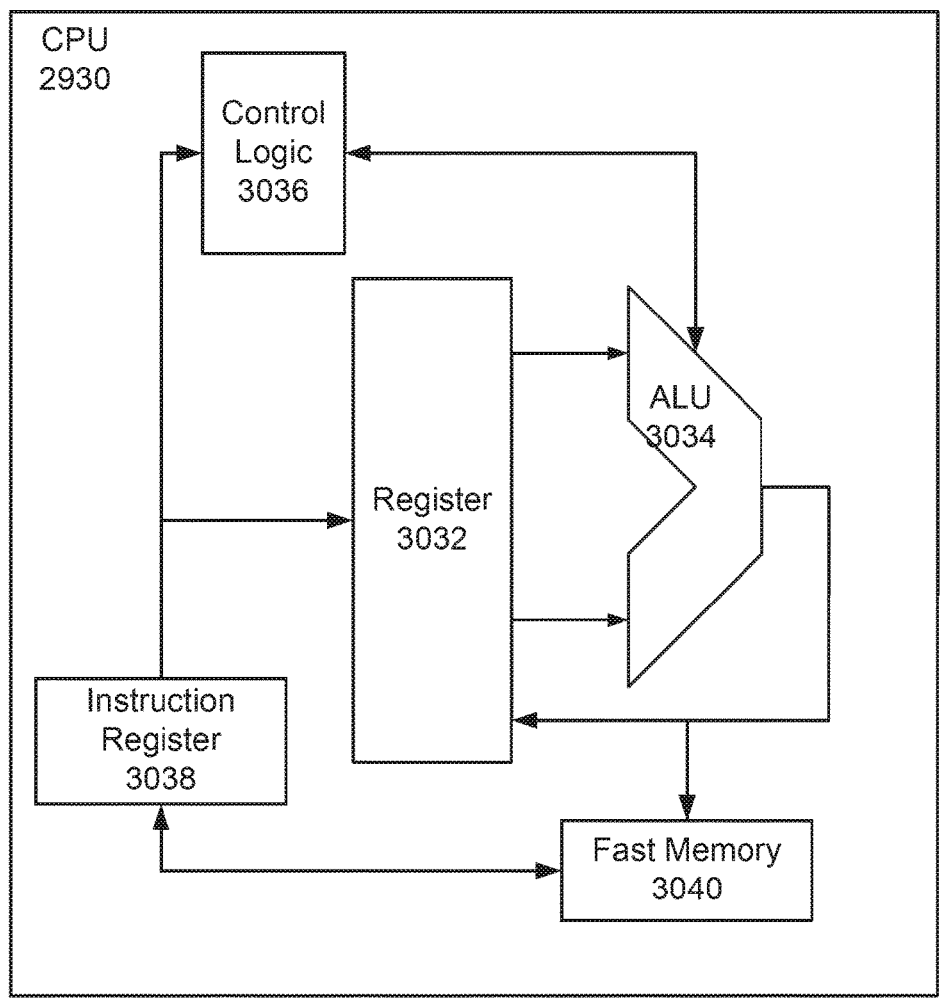
FIG. 30 is a block diagram illustrating an exemplary CPU of a chipset according to an embodiment.

For example, FIG. 30 shows one implementation of CPU 2930. In one implementation, an instruction register 3038 retrieves instructions from a fast memory 3040. At least part of these instructions are fetched from an instruction register 3038 by a control logic 3036 and interpreted according to the instruction set architecture of the CPU 2930. Part of the instructions can also be directed to a register 3032. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using an arithmetic logic unit (ALU) 3034 that loads values from the register 3032 and performs logical and mathematical operations on the loaded values according to the instructions. The results from these operations can be fed back into the register 3032 and/or stored in a fast memory 3040. According to aspects of the disclosure, the instruction set architecture of the CPU 2930 can use a reduced instruction set computer (RISC), a complex instruction set computer (CISC), a vector processor architecture, or a very long instruction word (VLIW) architecture. Furthermore, the CPU 2930 can be based on the Von Neuman model or the Harvard model. The CPU 2930 can be a digital signal processor, an FPGA, an ASIC, a PLA, a PLD, or a CPLD. Further, the CPU 2930 can be an x86 processor by Intel or by AMD; an ARM processor; a Power architecture processor by, e.g., IBM; a SPARC architecture processor by Sun Microsystems or by Oracle; or other known CPU architectures.

Referring again to FIG. 29, the data processing system 2900 can include the SB/ICH 2920 being coupled through a system bus to an I/O Bus, a read only memory (ROM) 2956, universal serial bus (USB) port 2964, a flash binary input/output system (BIOS) 2968, and a graphics controller 2958. PCI/PCIe devices can also be coupled to SB/ICH 2920 through a PCI bus 2962.

The PCI devices can include, for example, Ethernet adapters, add-in cards, and PC cards for notebook computers. The Hard disk drive 2960 and CD-ROM 2966 can use, for example, an integrated drive electronics (IDE) or serial advanced technology attachment (SATA) interface. In one implementation the I/O bus can include a super I/O (SIO) device.

Further, the hard disk drive (HDD) 2960 and optical drive 2966 can also be coupled to the SB/ICH 2920 through a system bus. In one implementation, a keyboard 2970, a mouse 2972, a parallel port 2978, and a serial port 2976 can be connected to the system bus through the I/O bus. Other peripherals and devices can be connected to the SB/ICH 2920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein can also be executed by various distributed components of a system. For example, one or more processors can execute these system functions, wherein the processors are distributed across multiple components communicating in a network. The distributed components can include one or more client and server machines, which can share processing, such as a cloud computing system, in addition to various human interface and communication devices (e.g., display monitors, smart phones, tablets, personal digital assistants (PDAs)). The network can be a private network, such as a LAN or WAN, or can be a public network, such as the Internet input to the system can be received via direct user input and received remotely either in real-time or as a batch process. Additionally, some implementations can be performed on modules or hardware not identical to those described. Accordingly, other implementations are within the scope that can be claimed.

The functions and features described herein may also be executed by various distributed components of a system. For example, one or more processors may execute these system functions, wherein the processors are distributed across multiple components communicating in a network. For example, distributed performance of the processing functions can be realized using grid computing or cloud computing. Many modalities of remote and distributed computing can be referred to under the umbrella of cloud computing, including: software as a service, platform as a service, data as a service, and infrastructure as a service. Cloud computing generally refers to processing performed at centralized locations and accessible to multiple users who interact with the centralized processing locations through individual terminals.

Figure 31:
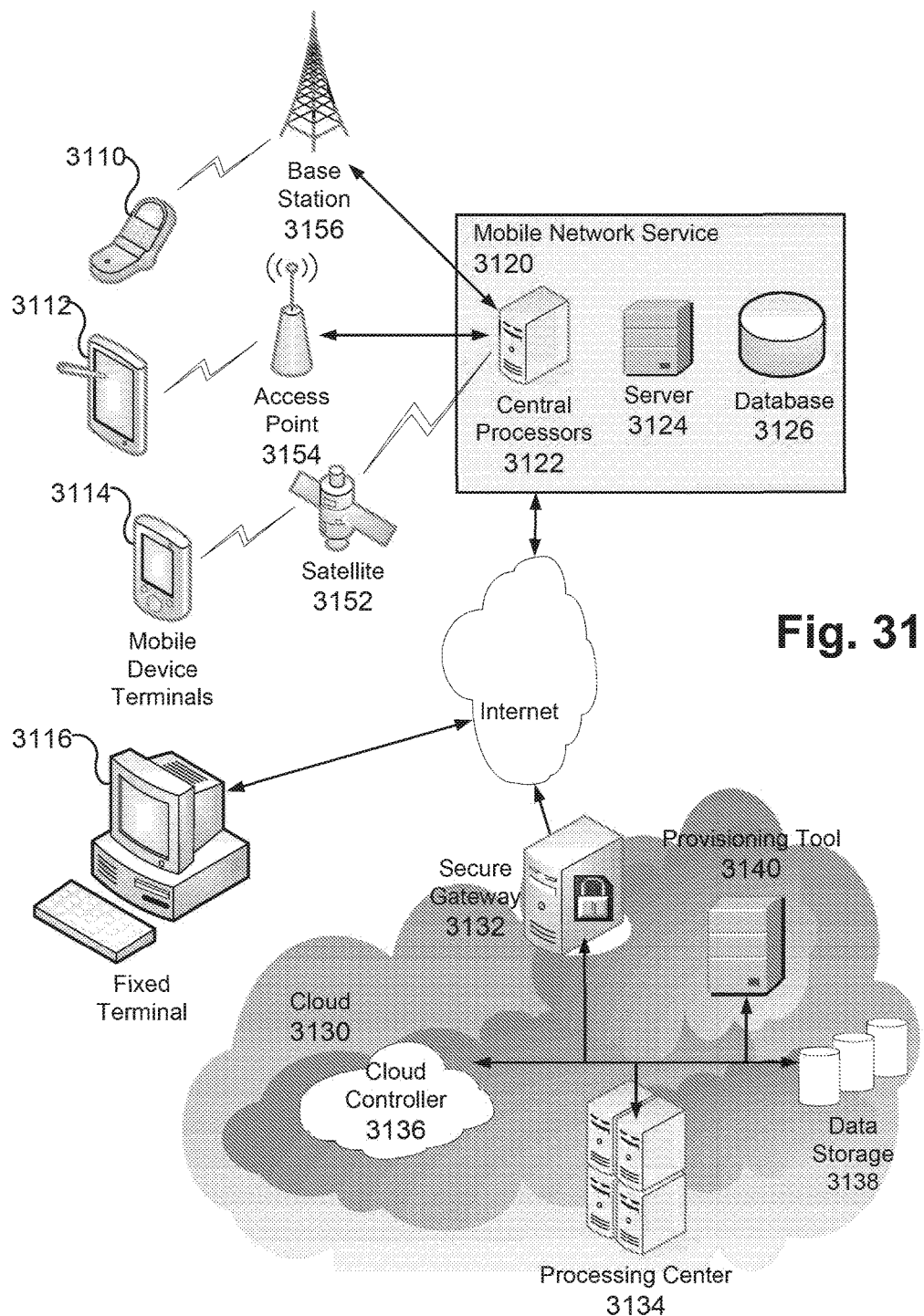
FIG. 31 illustrates an exemplary cloud computing system according to an embodiment.

FIG. 31 illustrates an example of a cloud computing system, wherein users access the cloud through mobile device terminals or fixed terminals that are connected to the Internet. One or more of the control servers 710, 790, 791, 792, or 793, the inferential modeling servers 720, or a device used in association with the HMIs 785 of FIG. 6 could be used in the cloud computing system illustrated in FIG. 31.

The mobile device terminals can include a cell phone 3110, a tablet computer 3112, and a smartphone 3114, for example. The mobile device terminals can connect to a mobile network service 3120 through a wireless channel such as a base station 3156 (e.g., an Edge, 3G, 4G, or LTE Network), an access point 3154 (e.g., a femto cell or WiFi network), or a satellite connection 3152. In one implementation, signals from the wireless interface to the mobile device terminals (e.g., the base station 3156, the access point 3154, and the satellite connection 3152) are transmitted to a mobile network service 3120, such as an EnodeB and radio network controller, UMTS, or HSDPA/HSUPA. Mobile users' requests and information are transmitted to central processors 3122 that are connected to servers 3124 to provide mobile network services, for example. Further, mobile network operators can provide service to mobile users for authentication, authorization, and accounting based on home agent and subscribers' data stored in databases 3126, for example. The subscribers' requests are subsequently delivered to a cloud 3130 through the Internet.

A user can also access the cloud through a fixed terminal 3116, such as a desktop or laptop computer or workstation that is connected to the Internet via a wired network connection or a wireless network connection. The mobile network service 3120 can be a public or a private network such as an LAN or WAN network. The mobile network service 3120 can be wireless such as a cellular network including EDGE, 3G and 4G wireless cellular systems. The wireless mobile network service 3120 can also be Wi-Fi, Bluetooth, or any other wireless form of communication that is known.

The user's terminal, such as a mobile user terminal and a fixed user terminal, provides a mechanism to connect via the Internet to the cloud 3130 and to receive output from the cloud 3130, which is communicated and displayed at the user's terminal. In the cloud 3130, a cloud controller 3136 processes the request to provide users with the corresponding cloud services. These services are provided using the concepts of utility computing, virtualization, and service-oriented architecture.

In one implementation, the cloud 3130 is accessed via a user interface such as a secure gateway 3132. The secure gateway 3132 can for example, provide security policy enforcement points placed between cloud service consumers and cloud service providers to interject enterprise security policies as the cloud-based resources are accessed. Further, the secure gateway 3132 can consolidate multiple types of security policy enforcement, including for example, authentication, single sign-on, authorization, security token mapping, encryption, tokenization, logging, alerting, and API control. The cloud 3130 can provide to users, computational resources using a system of virtualization, wherein processing and memory requirements can be dynamically allocated and dispersed among a combination of processors and memories to create a virtual machine that is more efficient at utilizing available resources. Virtualization creates an appearance of using a single seamless computer, even though multiple computational resources and memories can be utilized according to increases or decreases in demand. In one implementation, virtualization is achieved using a provisioning tool 3140 that prepares and equips the cloud resources, such as the processing center 3134 and data storage 3138 to provide services to the users of the cloud 3130. The processing center 3134 can be a computer cluster, a data center, a main frame computer, or a server farm. In one implementation, the processing center 3134 and data storage 3138 are collocated.

Embodiments described herein can be implemented in conjunction with one or more of the devices described above with reference to FIGS. 27-31. Embodiments are a combination of hardware and software, and circuitry by which the software is implemented.

FIG. 32 illustrates an exemplary algorithmic flowchart for performing a method 3200 of retrieving and processing real-time data according to one aspect of the present disclosure. The hardware description above, exemplified by any one of the structural examples shown in FIG. 27, 28, or 29, constitutes or includes specialized corresponding structure that is programmed or configured to perform the algorithm shown in FIG. 32. For example, the algorithm shown in FIG. 32 may be completely performed by the circuitry included in the single device shown in FIG. 27 or 28, or the chipset as shown in FIG. 29, or the algorithm may be completely performed in a shared manner distributed over the circuitry of any plurality of the devices shown in FIG. 31.

In FIG. 32, method 3200 includes retrieving a plurality of electrical signals from one or more field instruments hardwired to an associated junction box of a plurality of junction boxes in step S3210. Method 3200 also includes converting each electrical signal to digital data via an autonomous process interface system of each junction box in step S3220. Method 3200 also includes processing the digital data for status changes, sequence of events, and publication of changed values, via a virtual input/output system associated with a master autonomous process interface system of a master junction box, wherein the master junction box is connected to each junction box in step S3230. Method 3200 also includes publishing output signal changes received from one or more virtual controllers to the master autonomous process interface system, acquired by the virtual input/output system in step S3240. Method 3200 also includes interconnecting process control applications of each virtual controller with the autonomous process interface system of each junction box and the master autonomous process interface system, via real-time DDS middleware in step S3250.

The average communication latency and aggregate messaging capacity among process control applications and distributed autonomous process interface systems was evaluated. The overall performance results support an optimal collaborative automation platform to handle all process control applications. It also does not impose any inherent limit on the aggregate data messaging capacity, making it suitable for scalable automation platforms.

Embodiments described herein include physically and logically decoupling the controller from the I/O racks and capitalizing on emerging real-time DDS middleware technology for exchanging data among all process control applications to realize the interoperability of components. Embodiments described herein provide an optimum process control environment through an efficient and effective integration of sequential and regulatory control, advanced regulatory control, multivariable control, unit-based process control, and plant-wide advanced process control in a single collaborative automation platform. This provides optimum operation of processing equipment for achieving maximum yield of manufacturing facilities.

In addition to overcoming the obsolescence challenges of proprietary programmable logic controllers, benefits of embodiments described herein include reducing the initial capital cost by eliminating the need of process interface buildings, marshaling and system cabinets, and associated cabling, as well as the need for multiple proprietary stand-alone controllers and communication components. Other benefits include minimizing the life cycle capital cost to sustain the initial capital investment, improving cyber-security protection at the control level, improving system performance, utilization, and management of change, improving system availability and real-time system integration, and improving project scheduling during system testing, verification, and installation.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative and not limiting thereof. The disclosure, including any readily discernible variants of the teachings herein, defines in part, the scope of the foregoing claim terminology.

The invention claimed is:

1. A collaborative automation platform, comprising:
    a fault-tolerant control server hosting one or more virtual controllers;
    a fault-tolerant input/output server hosting a virtual input/output system;
    a master autonomous process interface system connected to the virtual input/output system, via a local area input/output network;
    a plurality of distributed autonomous process interface (DAPI) systems connected to the master autonomous process interface system, each DAPI system hardwired to a plurality of field instruments; and
    real-time data distribution service (DDS) middleware, configured for execution with the fault-tolerant control server, the fault-tolerant input/output server, the master autonomous process interface system, and the plurality of DAPI systems.

2. The collaborative automation platform of claim 1, wherein each DAPI system is configured to retrieve measurement data from the plurality of field instruments and convert the measurement data to digital data.

3. The collaborative automation platform of claim 1, wherein each DAPI system comprises a standalone DDS-enabled communication adapter and one or more Ethernet communication ports.

4. The collaborative automation platform of claim 1, wherein the master autonomous process interface system is connected to the local area input/output network, via an Ethernet switch uplink.

5. The collaborative automation platform of claim 1, wherein the real-time DDS middleware is configured to interconnect process control applications of the fault-tolerant control server with the master autonomous process interface system and the plurality of DAPI systems.

6. The collaborative automation platform of claim 5, wherein the real-time DDS middleware is configured to provide publish-and-subscribe communication between the process control applications and the local area input/output network.

7. A method of retrieving and processing real-time data, the method comprising:
   retrieving a plurality of electrical signals from one or more field instruments hardwired to an associated junction box of a plurality of junction boxes;
   converting each electrical signal to digital data via an autonomous process interface system of each junction box;
   processing the digital data for status changes, sequence of events, and publication of changed values, via a virtual input/output system associated with a master autonomous process interface system of a master junction box, the master junction box connected to each junction box;
   publishing output signal changes received from one or more virtual controllers to the master autonomous process interface system, acquired by the virtual input/output system; and
   interconnecting process control applications of each virtual controller with the autonomous process interface system of each junction box and the master autonomous process interface system, via real-time data distribution service (DDS) middleware.

8. The method of claim 7, further comprising:
   interconnecting each autonomous process interface system of the plurality of junction boxes with a local area input/output network, via the master autonomous process interface system, wherein the master junction box includes an Ethernet switch uplink connected to the local area input/output network.

9. The method of claim 8, wherein each of the autonomous process interface systems for the plurality of junction boxes and the master autonomous process interface system include commercial off-the-shelf (COTS) input/output components.

10. The method of claim 7, wherein the method is implemented, via the virtual input/output system, a virtual input/output server, a virtual controller server, the one or more virtual controllers, and a local area input/output network.

11. The method of claim 10, wherein the real-time DDS middleware is configured for execution with the virtual input/output system, the virtual input/output server, the virtual controller server, the one or more virtual controllers, the local area input/output network, each of the autonomous process interface systems for the plurality of junction boxes, and the master autonomous process interface system.

\* \* \* \* \*